United States Patent
Dhanda et al.

(10) Patent No.: US 8,792,875 B2
(45) Date of Patent: Jul. 29, 2014

(54) RESTRICTING ACCESS OF A WIRELESS COMMUNICATION DEVICE TO A COMMUNICATION CHANNEL

(75) Inventors: Mungal Singh Dhanda, Slough (GB); Philip J. Children, Farnborough (GB); Vikrant Jain, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/440,890

(22) Filed: Apr. 5, 2012

(65) Prior Publication Data
US 2013/0095863 A1 Apr. 18, 2013

Related U.S. Application Data

(60) Provisional application No. 61/473,667, filed on Apr. 8, 2011, provisional application No. 61/473,674, filed on Apr. 8, 2011.

(51) Int. Cl.
*H04M 3/00* (2006.01)
*H04W 48/08* (2009.01)
*H04W 48/02* (2009.01)
*H04W 68/00* (2009.01)

(52) U.S. Cl.
CPC .............. *H04W 48/08* (2013.01); *H04W 68/00* (2013.01); *H04W 48/02* (2013.01)
USPC ............ 455/419; 455/418; 455/518; 370/230

(58) Field of Classification Search
CPC ..... H04W 8/245; H04W 76/005; H04L 47/10
USPC ............................ 455/419, 418, 518; 370/230
See application file for complete search history.

(56) References Cited

U.S. PATENT DOCUMENTS

| | | | |
|---|---|---|---|
| 6,438,375 B1 | 8/2002 | Muller | |
| 8,045,973 B2 | 10/2011 | Chambers | |
| 2008/0032714 A1 | 2/2008 | Suzuki et al. | |
| 2008/0293429 A1* | 11/2008 | Harris et al. | 455/453 |
| 2010/0080130 A1* | 4/2010 | Gilbert et al. | 370/242 |
| 2010/0158039 A1* | 6/2010 | Koide et al. | 370/447 |
| 2010/0248771 A1* | 9/2010 | Brewer et al. | 455/518 |
| 2010/0267391 A1 | 10/2010 | Schmitt | |
| 2010/0318641 A1 | 12/2010 | Bullard et al. | |
| 2013/0170343 A1* | 7/2013 | Ye et al. | 370/230 |

FOREIGN PATENT DOCUMENTS

| | | |
|---|---|---|
| EP | 1469698 A2 | 10/2004 |
| WO | 0052948 A1 | 9/2000 |
| WO | WO-2008094670 A2 | 8/2008 |

OTHER PUBLICATIONS

International Search Report and Written Opinion—PCT/US2012/032643—ISA/EPO—Jul. 6, 2012.
International Searching Authority—Response to Second Written Opinion—Article 34—May 30, 2013.
Written Opinion of the International Preliminary Examining Authority—PCT/US2012/032643—IPEA—Feb. 4, 2013.
International Searching Authority—Response to Second Written Opinion—Article 34—Oct. 30, 2012.
Telefon AB LME Ericsson, St-Ericsson, Vodafone Group PLC, "Implicit Immediate Assignment Reject," 3GPP TSG-GERAN Meeting #49, GP-110276, Chengdu, China, Feb. 28-Mar. 4, 2011.

* cited by examiner

*Primary Examiner* — Danh Le
(74) *Attorney, Agent, or Firm* — QUALCOMM IP Department; James Hunt Yancey, Jr.

(57) ABSTRACT

Devices, systems, articles of manufacture, and methods for restricting access to a communication channel are described. According to some embodiments, a message with access restriction data addressed to at least one wireless communication device is generated. The access restriction data indicates that a group of wireless communication devices is associated with a priority value and that the group of wireless communication devices has restricted access to a communication channel. The message is transmitted to the at least one wireless communication device. Other aspects, embodiments and features are also claimed and described.

52 Claims, 16 Drawing Sheets

US 8,792,875 B2

RESTRICTING ACCESS OF A WIRELESS COMMUNICATION DEVICE TO A COMMUNICATION CHANNEL

RELATED APPLICATIONS AND PRIORITY CLAIMS

This application is related to and claims priority from U.S. Provisional Patent Application Ser. No. 61/473,667, filed Apr. 8, 2011, for "APPARATUS AND METHODS FOR RESTRICTING ACCESS TO A COMMUNICATION CHANNEL BY WIRELESS TERMINALS OF A WIRELESS COMMUNICATION SYSTEM," and from U.S. Provisional Patent Application Ser. No. 61/473,674, filed Apr. 8, 2011, for "APPARATUS AND METHODS FOR RESTRICTING ACCESS TO A COMMUNICATION CHANNEL BY WIRELESS TERMINALS OF A WIRELESS COMMUNICATION SYSTEM." All of said applications are hereby incorporated herein by reference for all purposes and as if fully set forth below in their entireties.

TECHNICAL FIELD

The present disclosure relates generally to communication systems. More specifically, the present disclosure relates to restricting access of a wireless communication device to a communication channel.

BACKGROUND

Wireless communication systems have become an important means by which many people worldwide have come to communicate. A wireless communication system may provide communication for a number of subscriber stations, each of which may be serviced by a base station.

Wireless communication systems typically include a network and multiple wireless communication devices. Wireless communication devices require access to communication channels to communicate with the network. However, as the number of wireless communication devices increase, the available network resources may decrease. Therefore, benefits may be realized by reducing network congestion and by managing access to the network by wireless communication devices.

SUMMARY OF SOME EXAMPLE EMBODIMENTS

Devices, systems, articles of manufacture and methods for restricting access to a communication channel are described. According to one embodiment, a method for restricting access to a communication channel is described. A message with access restriction data addressed to at least one wireless communication device is generated. The access restriction data indicates that a group of wireless communication devices is associated with a priority value and that the group of wireless communication devices has restricted access to a communication channel. The message is transmitted to the at least one wireless communication device.

Methods may also have additional features. For example, a method may be performed by a base station. The access restriction data may be suitable for both packet processing and circuit-switched processing. The priority value may include a set of priority values and the generating the access restriction data may generate the set of priority values. A portion of the message may be a rest octets information element that may include access restriction data. The message may also indicate whether access may be granted to a specified communication channel by a specified wireless communication device. The rest octets information element may be one an immediate assignment reject message, an immediate assignment extended message, an immediate assignment message, a paging request type 1 message, a paging request type 2 message or a paging request type 3 message.

The access restriction data may indicate a time interval during which wireless communication devices associated with the priority value have restricted access. The time interval may include one time interval of a set of time intervals. Generating the access restriction data may indicate the one time interval. The one time interval may be a time interval range that may be a range of 1 to 120 seconds, a range of 1 to 60 minutes, a range of 1 to 24 hours or a range of 1 to 15 days. The communication channel may include a plurality of dedicated channels that is available for use by wireless communication devices in a wireless communication system. The wireless communication devices that have the priority value associated with them may have no access to any of the plurality of dedicated channels during the time interval. The priority value may be obtained from a receiver.

The message may be a paging message addressed to the at least one wireless communication device. Transmitting the message may include transmitting the paging message on a paging channel. A portion of the paging message may include a rest octets information element.

The message may include an access message addressed to the at least one wireless communication device. Transmitting the message may include transmitting the access message on an access channel. A portion of the access message may include a rest octets information element.

According to another embodiment, a method for restricting access to a communication channel by a wireless communication device is described. A message including access restriction data is received. The access restriction data indicates that a group of wireless communication devices is associated with a priority value and that the group of wireless communication devices has restricted access to a communication channel. Access to the communication channel is restricted based on the indication provided by the access restriction data.

A portion of the message may be a rest octets information element that may include access restriction data. Restricting access may also be based on the rest octets information element. The rest octets information element may be an immediate assignment reject message, an immediate assignment extended message, an immediate assignment message, a paging request type 1 message, a paging request type 2 message or a paging request type 3 message.

The priority value may include a set of priority values. Generating the access restriction data may generate the set of priority values. The wireless communication device may include a stored priority value. Restricting access may occur when the priority value includes the stored priority value.

The communication channel may include an uplink communication channel. The uplink data via the uplink communication channel may be transmitted. Uplink data may include a request for access to the communication channel.

The access restriction data may indicate a time interval during which wireless communication devices associated with the priority value have restricted access. Restricting access may be further based on a value of time within the time interval. Access restriction to the communication channel may be removed when the value of time has elapsed. The time interval may include one time interval of a set of time intervals. Generating the access restriction data may also indicate the one time interval. The one time interval may be a time interval range that may be a range of 1 to 120 seconds, a range of 1 to 60 minutes, a range of 1 to 24 hours or a range of 1 to 15 days. The communication channel may include a plurality of dedicated channels that is available for use by wireless communication devices in a wireless communication system. Wireless communication devices that have the priority value associated with them may have no access to any of the plurality of dedicated channels during the time interval. The message may also indicate whether access may be granted to a specified communication channel by a specified wireless communication device.

The message may be a paging message and may be received on a paging channel. The message may be an access message and may be received on an access channel.

According to yet another embodiment, an apparatus for restricting access to a communication channel is described. The apparatus includes a processor and executable instructions stored in memory that is in electronic communication with the processor. The apparatus generates a message including access restriction data addressed to at least one wireless communication device. The access restriction data indicates that a group of wireless communication devices is associated with a priority value and that the group of wireless communication devices has restricted access to a communication channel. The apparatus also transmits the message to the at least one wireless communication device.

According to still another embodiment, a wireless communication device for restricting access to a communication channel is described. The wireless communication device includes a processor and executable instructions stored in memory that is in electronic communication with the processor. The wireless communication device receives a message including access restriction data. The access restriction data indicates that a group of wireless communication devices is associated with a priority value and that the group of wireless communication devices has restricted access to a communication channel. The wireless communication device also restricts access to the communication channel based on the indication provided by the access restriction data.

According to another embodiment, a computer-program product for restricting access to a communication channel is described. The computer-program product includes a non-transitory computer-readable medium with instructions thereon. The computer-program product includes instructions for generating a message including access restriction data addressed to at least one wireless communication device. The access restriction data indicates that a group of wireless communication devices is associated with a priority value and that the group of wireless communication devices has restricted access to a communication channel. The computer-program product also includes instructions transmitting the message to the at least one wireless communication device.

According to still another embodiment, a computer-program product for restricting access to a communication channel on a wireless communication device is described. The computer-program product includes a non-transitory computer-readable medium having instructions thereon. The computer-program product includes instructions for receiving a message including access restriction data. The access restriction data indicates that a group of wireless communication devices is associated with a priority value and that the group of wireless communication devices has restricted access to a communication channel. The computer-program product also includes instructions for restricting access to the communication channel based on the indication provided by the access restriction data.

According to yet another embodiment, an apparatus for restricting access to a communication channel is described. The apparatus includes means for generating a message including access restriction data addressed to at least one wireless communication device. The access restriction data indicates that a group of wireless communication devices is associated with a priority value and that the group of wireless communication devices has restricted access to a communication channel. The apparatus also includes means for transmitting the message to the at least one wireless communication device.

According to still yet another embodiment, a wireless communication device for restricting access to a communication channel is described. The wireless communication device includes means for receiving a message including access restriction data. The access restriction data indicates that a group of wireless communication devices is associated with a priority value and that the group of wireless communication devices has restricted access to a communication channel. The wireless communication device also includes means for restricting access to the communication channel based on the indication provided by the access restriction data.

Other aspects, features and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION OF ALTERNATIVE & EXEMPLARY EMBODIMENTS

Figure 1:
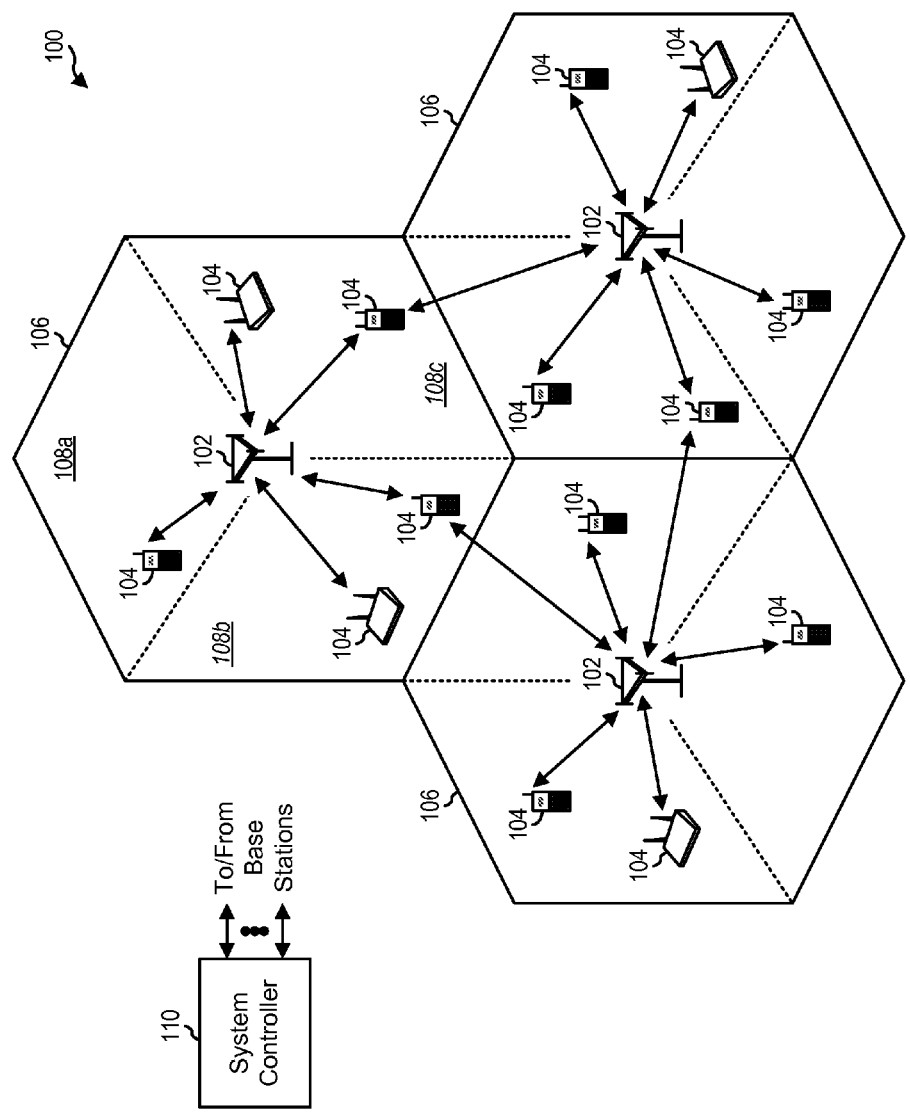
FIG. 1 shows an example of a wireless communication system in which embodiments of the present invention disclosed herein may be utilized.

More and more people are using wireless communication devices, such as, mobile phones, not only for voice but also for data communications. Telecommunications networks are being placed under increasing strain, both due to increasing bandwidth requirements of smartphones and mobile computers, and the increasing numbers devices and programs that seek access to the networks. For example, many applications running on smartphones periodically access the network to check for updates.

While each access itself may only consume a relatively small amount of bandwidth, large numbers of devices running lots of applications can place a significant load on networks, and signaling and control channels in particular. The increasing prevalence of machine type communication (MTC) devices (e.g., machine-to-machine (M2M)) can similarly increase demands placed upon network resources.

A wireless communication device (e.g., wireless terminal) requiring network resource may wirelessly transmit a request for access to a communication channel, for example, a traffic channel. A traffic channel is also known as a dedicated channel and is used to carry dedicated data between the network and a wireless communication device. Dedicated data is directed to or from a particular wireless communication device, as compared to broadcast data which is transmitted by the network via a broadcast channel and is directed to plural wireless communication devices.

The wireless communication device transmits a request for access to a channel in the form of a channel request message. The channel request message may be transmitted on an uplink (from the wireless communication device to a network apparatus e.g., a base station) via an access channel for requesting access to a channel. The wireless communication device may continue sending channel requests periodically until either it has transmitted a specified number of requests or it receives a response from the network.

The network may respond to the channel request by transmitting on a downlink (from the network apparatus to the wireless communication device) an access message, which includes either an assignment message or a reject message (commonly termed an assignment reject message).

The network transmits the access message via an access channel for granting or refusing access to a channel by a wireless communication device. The assignment message indicates that the wireless communication device that requested access has been assigned a channel, i.e., the wireless communication device has been granted access to the channel. The reject message indicates that the wireless communication device that requested access has not been assigned a channel. The reject message is transmitted when the network does not have enough resource to allocate the requested channel, for example, when all suitable channels are in use. A wireless communication device that receives a reject message will discontinue sending access requests.

A typical network can receive, during a given time period, many more channel requests than it can transmit messages on the access channel to grant or refuse access. This is partly because each cell has many wireless communication devices and only one base station which can transmit only a limited number of messages in a given time period. Also each access reject message can only reject a limited number of wireless communication devices. For example, a single reject message may only be able to reject up to four wireless communication devices.

Due to an increasing number of wireless communication devices present in any one cell or sector, the network can only grant access to a small portion of the wireless communication devices that request such access. Wireless communication devices that have sent channel requests and have not received any response from the network within a specified period will send one or more further channel requests for access. A wireless communication device may transmit up to a maximum number of channel requests. The maximum number may be defined by the network via broadcast information transmitted by the network. For example, a system controller may send broadcast information specifying which wireless communication devices may access the network. During congested traffic conditions, a wireless communication device may transmit several channel requests before receiving an access message from the network. Under these congested conditions, the wireless communication device is effectively wasting resources by using the uplink access channel unproductively and by increasing the number of requests which the network receives, to which the network cannot respond.

When a wireless communication device has transmitted a maximum number of channel requests and has not received an assignment message within a specified period following the last channel request, the wireless communication device will determine that an access channel failure has occurred and will trigger cell reselection. The cell reselection may require the wireless communication device to perform a registration update before it can send or receive useful data. Registration updates may use significant system resources and may be time consuming Frequent cell reselection can therefore lead to poorer system performance.

One possible solution would be to increase the delay between adjacent channel requests from any given wireless communication device, but this only prolongs the problem. If the delay is too long then the wireless communication device may have generated new data to be sent (e.g., a new report) while its previously generated data (e.g., a previous report) is still waiting to be sent. An alternative solution would be to have multiple access channels, but this requires more network resources and may therefore be undesirable in certain instances.

Another solution would be to use access class barring which prevents one or more classes of wireless communication devices from making access. Access class barring is described in 3GPP TS 22.011 version 10.2.1 (section 4, "Access Control," in particular section 4.3.1). Access class barring is seldom used because it is a crude instrument and it takes time to take effect. It involves changing broadcast information which is sent less often and therefore it takes time before wireless communication devices have updated information. Access class barring also impacts battery life because all wireless communication devices need to wake up from idle mode and read system information that is broadcast on a broadcast channel. Moreover wireless communication systems often include 'legacy' wireless communication devices that were made before access class barring was developed. This solution would therefore exclude these legacy wireless communication devices.

Another solution may be for a network to reject a wireless communication device after it has made an access request and to command the wireless communication device not to make another access request for a certain period of time. This way the network could reject one, two, three, or four wireless communication devices by transmitting a single message via an access grant channel (AGCH). This rejection mechanism is described in 3GPP TS 44.018 version 9.6.0 (section 9.1.20). The mechanism works in real time but it can only address up to four wireless communication devices at a time. To reject more than four wireless communication devices would require transmitting more than one message on the AGCH and this could lead to unacceptably increased loading of the AGCH.

A mechanism for implicitly rejecting more than four wireless communication devices was proposed in document GP-110276 entitled "44.018 CR 0882, Implicit Immediate Assignment Reject" presented at technical meeting 3GPP GERAN #49 in Chengdu, China, Feb. 28 to Mar. 4, 2011. This is not an ideal solution for a number of reasons. First, the network transmits information elements that are intended for other purposes than rejecting wireless communication devices. Second, wireless communication devices need to understand some aspect of General Packet Radio Service (GPRS) in order to respond to the transmitted information elements. Many wireless communication devices (particularly very low-cost wireless communication devices) will not support General Packet Radio Service (GPRS) and therefore cannot respond. Finally, the proposed mechanism requires the wireless communication device to be in the process of making a channel request.

Embodiments of the present invention are provisioned for providing solutions enabling efficient network access and include various features aimed at addressing network congestion issues. For example, one configuration of some system and method embodiments of the present invention are directed to a network of a wireless communication system that can restrict access to a communication channel. This can be done by transmitting access restriction data (e.g., access messages or signals). Restriction may be for both wireless communication devices that operate using circuit-switched data and wireless communication devices that operate using packet data. In other words, the access restriction data is suitable for both circuit-switched processing and packet processing. This allows the access restricting data to be processed by a wireless communication device that may only process circuit-switched data. For example, the access restriction data may be included within a rest octets information element. This allows the formatting of the access restricting data to be flexible, as compared to using an information element intended for some other specific purpose.

By transmitting access restriction data via a paging channel and/or the access channel, access by any number of wireless communication devices may be restricted even when those wireless communication devices have not yet begun the process of requesting access. This may greatly reduce the number of failed access attempts when network traffic is congested. For example, a wireless communication device may receive access restriction data via the paging channel while the wireless communication device is in idle mode. The wireless communication device will then remain in idle mode and will not attempt to access the network, for instance, for a prescribed period. This results in reduced power consumption of the wireless communication device when the wireless communication device is in idle mode because the wireless communication device does not need to use energy to send or receive signals via any other channels.

Another advantage is reduced congestion of the access channel via which the network transmits access messages to wireless communication devices. This means that more wireless communication devices will timely receive responses from the network to channel requests that the wireless communication devices transmit.

The paging and/or access message may be addressed to any number of wireless communication devices, thereby further reducing the number of failed access attempts by wireless communication devices and avoiding unnecessary use of a channel used to request access. The paging and/or access message may be transmitted in a short time. For example, in some embodiments, the time period may be 10 milliseconds (ms), 20 ms, 40 ms, 60 ms, etc.

The number of wireless communication devices that are effectively addressed by the access restriction data can be controlled, for example, by the use of selective paging, paging groups or paging occasions.

Selective addressing makes it possible to provide access to an optimum number of wireless communication devices over a period during which the network capacity varies. Wireless communication devices listening to a particular paging group can be prevented from accessing the network. The network can send access restriction data in one paging group, two paging groups, three paging groups, etc. This allows different groups of wireless communication devices to be restricted from accessing the network at different times. It also prevents a different number of devices from making access at different times.

Now turning to the drawings, FIG. 1 shows an example of a wireless communication system 100 in which embodiments of the present invention disclosed herein may be utilized. The wireless communication system 100 includes multiple base stations 102 and multiple wireless communication devices 104. Each base station 102 provides communication coverage for a particular geographic area 106. The term "cell" can refer to a base station 102 and/or its coverage area 106 depending on the context in which the term is used.

The terms "wireless communication device" and "base station" utilized in this application can generally refer to an array of components. For example, as used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers and personal computers. A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. Also, the term "base station" can refer to a wireless communication station that is installed at a fixed location and used to communicate with wireless communication devices 104. A base station 102 may alternatively be referred to as an access point (including nano-, pico- and femto-cells), a Node B, an evolved Node B, a Home Node B or some other similar terminology.

To improve system capacity, a base station coverage area 106 may be partitioned into plural smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Wireless communication devices 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. As another example, for a distributed architecture, base stations 102 may communicate with one another as needed.

Figure 2:
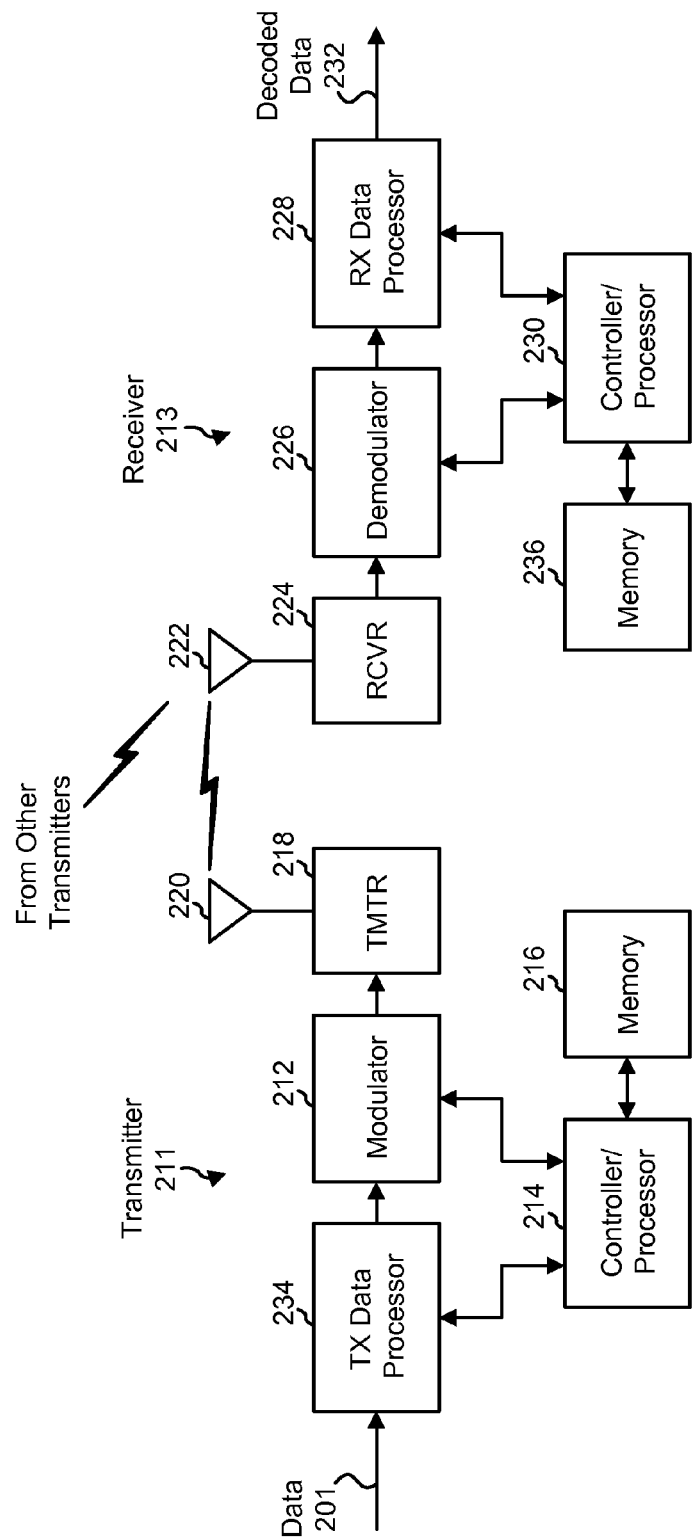
FIG. 2 shows a block diagram of a transmitter and a receiver in a wireless communication system according to some embodiments of the present invention.

FIG. 2 shows a block diagram of a transmitter 211 and a receiver 213 in a wireless communication system 100 according to some embodiments of the present invention. For the downlink, the transmitter 211 may be part of a base station 102 and the receiver 213 may be part of a wireless communication device 104. For the uplink, the transmitter 211 may be part of a wireless communication device 104 and the receiver 213 may be part of a base station 102.

At the transmitter 211, a transmit (TX) data processor 234 receives and processes (e.g., formats, encodes, and interleaves) data 201 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 218 conditions (e.g., filters, amplifies, and upconverts) the modulated signal and generates an RF modulated signal, which is transmitted via an antenna 220.

At the receiver 213, an antenna 222 receives RF modulated signals from the transmitter 211 and other transmitters. The antenna 222 provides a received RF signal to a receiver unit (RCVR) 224. The receiver unit 224 conditions (e.g., filters, amplifies, and downconverts) the received RF signal, digitizes the conditioned signal, and provides samples. A demodulator 226 processes the samples as described below and provides demodulated data. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 234, respectively, at the transmitter 211.

Controllers/processors 214 and 230 direct operation at the transmitter 211 and receiver 213, respectively. Memories 216 and 236 store program codes in the form of computer software and data used by the transmitter 211 and receiver 213, respectively.

Figure 3:
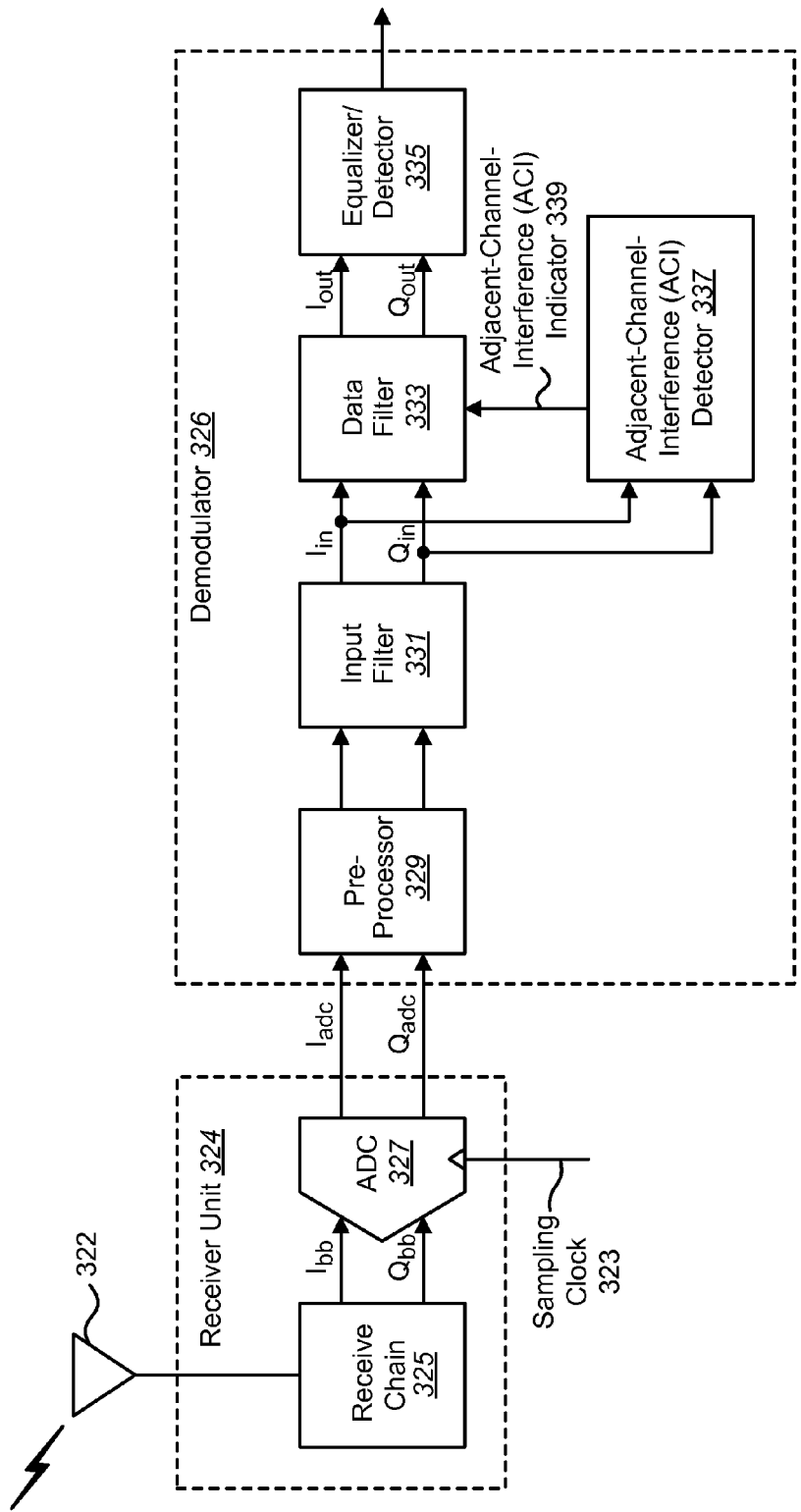
FIG. 3 shows a block diagram of a design of a receiver unit and demodulator at a receiver according to some embodiments of the present invention.

FIG. 3 shows a block diagram of a design of a receiver unit 324 and a demodulator 326 at a receiver 213 according to some embodiments of the present invention. Within the receiver unit 324, a receive chain 325 processes the received RF signal and provides I (inphase) and Q (quadrature) baseband signals, which are denoted as $I_{bb}$ and $Q_{bb}$. The receive chain 325 may perform low noise amplification, analog filtering, quadrature downconversion, etc. as desired or needed. An analog-to-digital converter (ADC) 327 digitizes the I and Q baseband signals at a sampling rate of $f_{adc}$ from a sampling clock 323 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 329 performs pre-processing on the I and Q samples from the analog-to-digital converter (ADC) 327. For example, the pre-processor 329 may remove direct current (DC) offset, remove frequency offset, etc. An input filter 331 filters the samples from the pre-processor 329 based on a particular frequency response and provides input I and Q samples, which are denoted as $I_{in}$ and $Q_{in}$. The input filter 331 may filter the I and Q samples to suppress images resulting from the sampling by the analog-to-digital converter (ADC) 327 as well as jammers. The input filter 331 may also perform sample rate conversion, e.g., from 24× oversampling down to 2× oversampling. A data filter 333 filters the input I and Q samples from the input filter 331 based on another frequency response and provides output I and Q samples, which are denoted as $I_{out}$ and $Q_{out}$. The input filter 331 and the data filter 333 may be implemented with finite impulse response (FIR) filters, infinite impulse response (IIR) filters or filters of other types. The frequency responses of the input filter 331 and the data filter 333 may be selected to achieve good performance. In one design, the frequency response of the input filter 331 is fixed and the frequency response of the data filter 333 is configurable.

An adjacent-channel-interference (ACI) detector 337 receives the input I and Q samples from the input filter 331, detects for adjacent-channel-interference (ACI) in the received RF signal and provides an adjacent-channel-interference (ACI) indicator 339 to the data filter 333. The adjacent-channel-interference (ACI) indicator 339 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 339, to achieve desirable performance.

An equalizer/detector 335 receives the output I and Q samples from the data filter 333 and performs equalization, matched filtering, detection and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 935-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
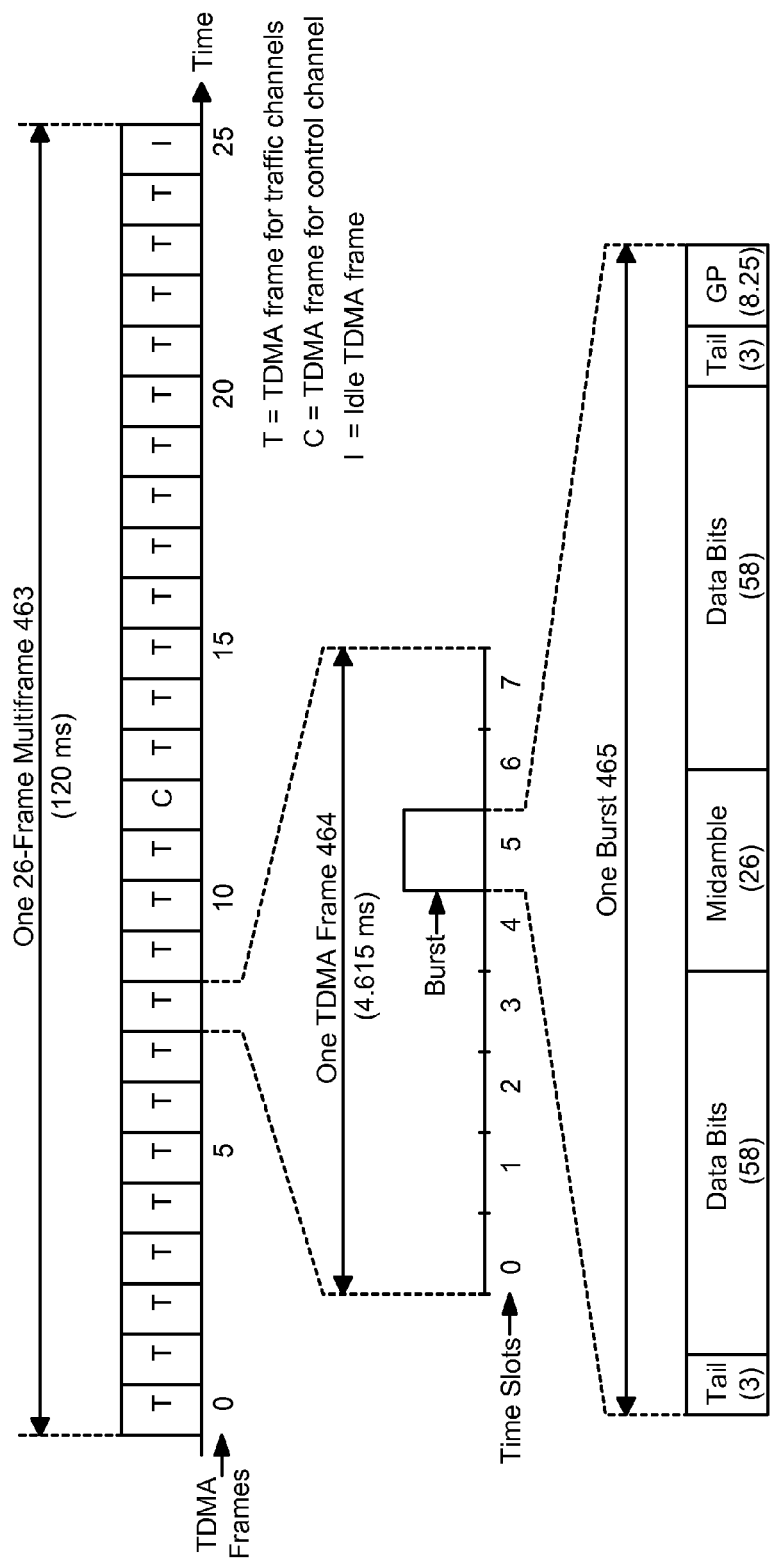
FIG. 4 shows example frame and burst formats in GSM according to some embodiments of the present invention.

FIG. 4 shows example frame and burst formats in GSM. The timeline for transmission is divided into multiframes 463 according to some embodiments of the present invention. For traffic channels used to transmit user-specific data, each multiframe 463 in this example includes 26 TDMA frames 464, which are labeled as TDMA frames 0 through 25. The traffic channels are sent in TDMA frames 0 through 11 and TDMA frames 13 through 24 of each multiframe 463. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 465 in GSM. Each burst 465 includes two tail fields, two data fields, a training sequence (or midamble) field and a guard period (GP). The number of symbols in each field is shown inside the parentheses. A burst 465 includes symbols for the tail, data and midamble fields. No symbols are sent in the guard period. TDMA frames of a particular carrier frequency are numbered and formed in groups of 26 or 51 TDMA frames 464 called multiframes 463.

Figure 5:
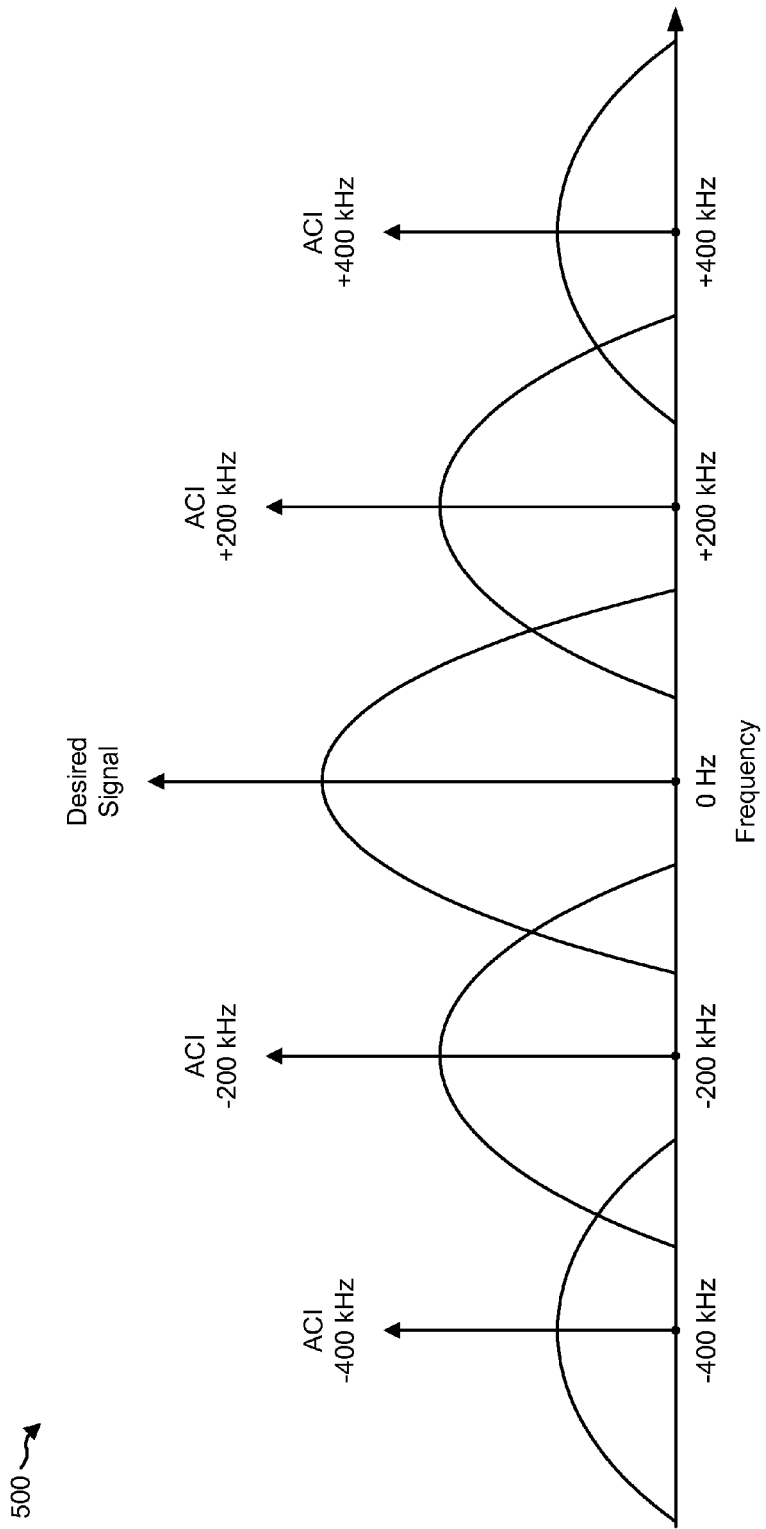
FIG. 5 shows an example spectrum in a GSM system according to some embodiments of the present invention.

FIG. 5 shows an example spectrum 500 in a GSM system according to some embodiments of the present invention. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers or non-adjacent RF channels) have center frequencies that are +400 kHz and −400 kHz from the center frequency of the desired RF channel. There may be other RF channels in the spectrum 500, which are not shown in FIG. 5 for simplicity. In GSM, an RF modulated signal is generated with a symbol rate of $f_{sym}$=13000/40=270.8 symbols/second (ksps) and has a −3 decibel (dB) bandwidth of up to 135 kHz. The RF modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base Station 102 local oscillator (LO), using frequency offset estimation and correction. These bursts include a single tone, which corresponds to all "0" payload and training sequence. The all zero payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 may periodically wakeup to monitor the frequency burst to maintain its synchronization in standby mode. In the standby mode, the frequency offset is within ±2 kHz.

One or more modulation schemes are used in GERAN systems to communicate information such as voice, data and/or control information. Examples of the modulation schemes may include Gaussian Minimum Shift Keying (GMSK), M-ary Quadrature Amplitude Modulation (QAM) or M-ary PSK (Phase Shift Keying), where M=2$^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with 3π/8 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical. The EGPRS2 standard uses GMSK, QPSK, 8-PSK, 16-QAM and 32-QAM modulations. The modulation type can be changed from burst to burst. Q-PSK, 8-PSK, 16-QAM and 32-QAM modulations in EGPRS2 are linear, 4-level, 8-level, 16-level and 32-level phase modulations with 3π/4, 3π/8, π/4, −π/4 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical. The symbol pulse of Q-PSK, 16-QAM and 32-QAM can use spectrally narrow or wide pulse shapes.

Figure 6:
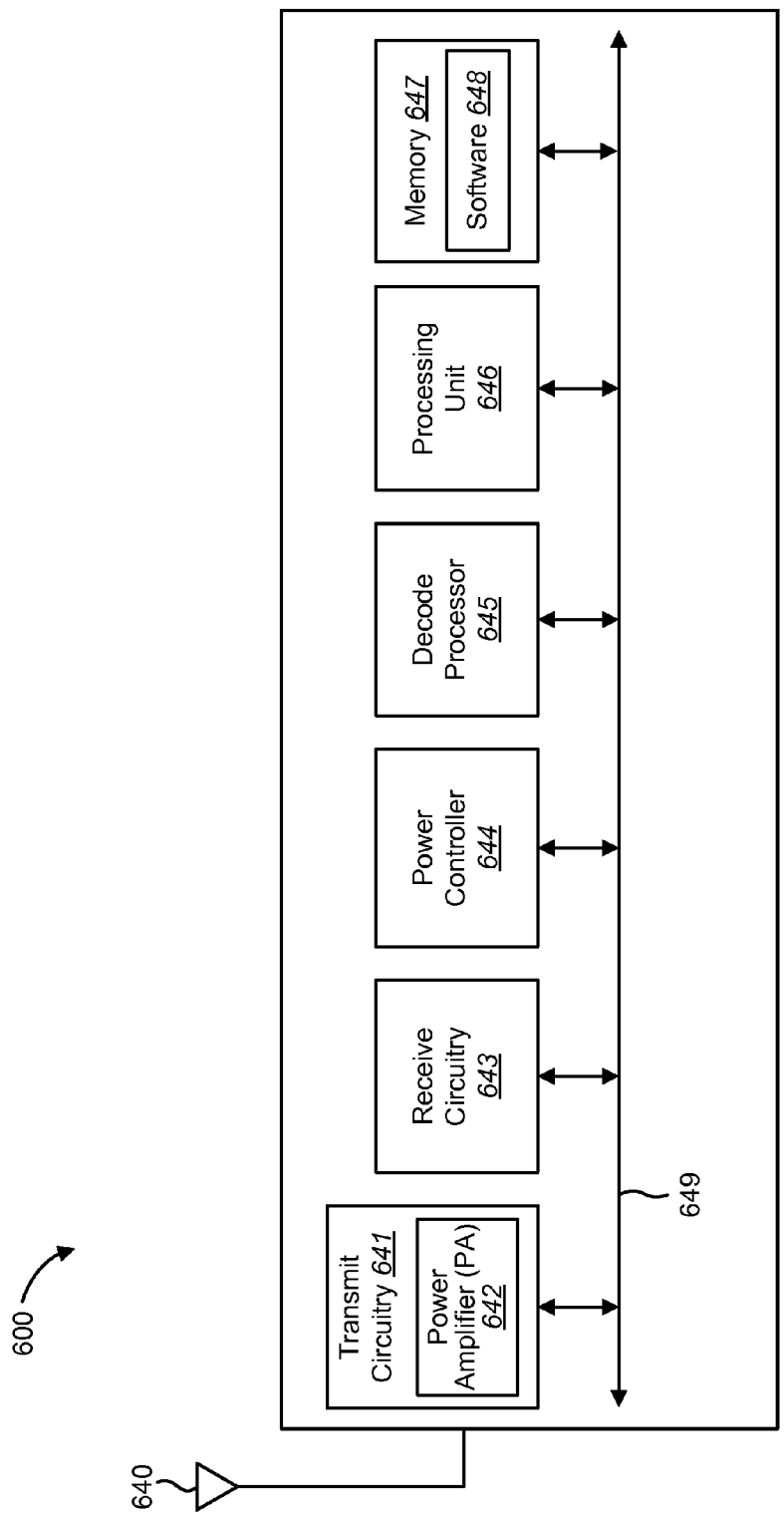
FIG. 6 illustrates an example of a wireless device according to some embodiments of the present invention that includes transmit circuitry (including a power amplifier), receive circuitry, a power controller, a decode processor, a processing unit for use in processing signals and memory.

FIG. 6 illustrates an example of a wireless device 600 that includes transmit circuitry 641 (including a power amplifier (PA) 642), receive circuitry 643, a power controller 644, a decode processor 645, a processing unit 646 for use in processing signals and memory 647 according to some embodiments of the present invention. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649 which may include a power bus, a control signal bus, and a status signal bus in addition to a data bus. For the sake of clarity, the various busses are illustrated in FIG. 6 as the bus system 649.

The steps of the methods discussed may also be stored as instructions in the form of software or firmware located in memory 647 in a wireless device 600. These instructions may be executed by the controller/processor(s) of the wireless device 600. Alternatively, or in conjunction, the steps of the methods discussed may be stored as instructions in the form of software or firmware 648 located in memory 647 in the wireless device 600. These instructions may be executed by the processing unit 646 of the wireless device 600 in FIG. 6.

Figure 7:
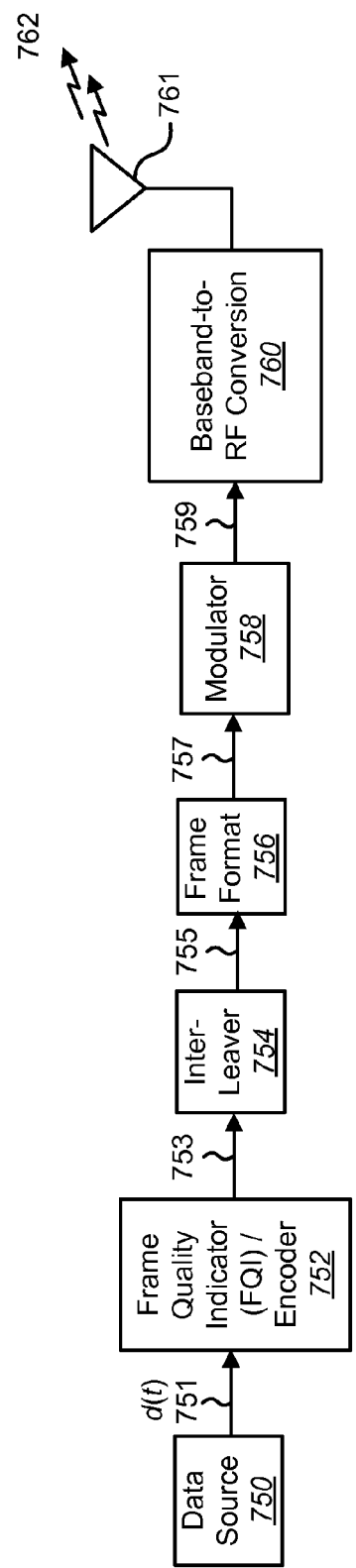
FIG. 7 illustrates an example of a transmitter structure and/or process according to some embodiments of the present invention.

FIG. 7 illustrates an example of a transmitter structure and/or process according to some embodiments of the present invention. The transmitter structure and/or process of FIG. 7 may be implemented in a wireless device such as a wireless communication device 104 or a base station 102. The functions and components shown in FIG. 7 may be implemented by software, hardware or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code or any other dimension. A frame 757 may be composed of a fixed plurality of such sub-segments, each sub-segment including a portion of the total number of symbols allocated to the frame 757. In one example, the interleaved symbols 755 are segmented into a plurality S of sub-segments making up a frame 757.

A frame format block 756 may further specify the inclusion of, e.g., control symbols (not shown) along with the interleaved symbols 755. Such control symbols may include, e.g., power control symbols, frame format information symbols, etc.

A modulator 758 modulates the frame 757 to generate modulated data 759. Examples of modulation techniques include binary phase shift keying (BPSK) and quadrature phase shift keying (QPSK). The modulator 758 may also repeat a sequence of modulated data.

A baseband-to-radio-frequency (RF) conversion block 760 may convert the modulated data 759 to RF signals for transmission via an antenna 761 as signal 762 over a wireless communication link to one or more wireless device receivers.

Figure 8:
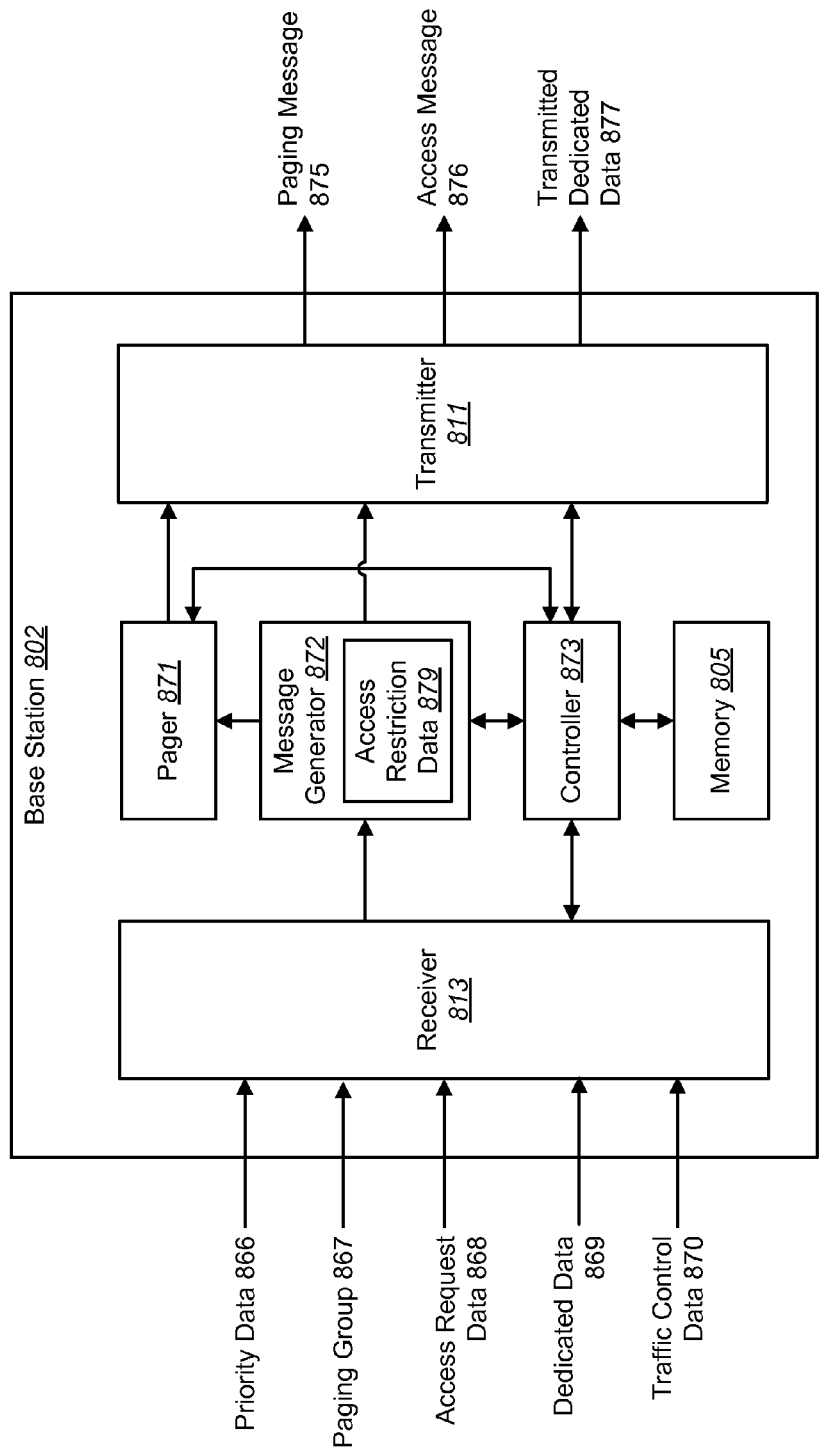
FIG. 8 is a block diagram illustrating one configuration of a base station in which embodiments of the present invention disclosed herein may be utilized.

FIG. 8 is a block diagram illustrating one configuration of a base station 802 in which embodiments of the present invention disclosed herein may be utilized. The base station 802 of FIG. 8 may be one configuration of the one or more base stations 102 as illustrated in FIG. 1. As discussed below in additional detail, the base station 802 can include various components that are connected or coupled together in the manner illustrated in FIG. 8. Of course, different arrangements can also be used as desired or necessary.

When the amount of network traffic is great and therefore few, if any, channels are available for a new connection, it is generally undesirable for wireless communication devices 104 to transmit channel requests. A base station 802 may use access restriction data 879 to reduce the number of wireless communication devices 104 making channel requests within a given time period. Additionally, in this manner, a large number of wireless communication devices 104 may be rejected by one paging message 875 and/or access message 876. For example, more than four wireless communication devices 104 can be rejected by one access message 876. Additionally, one to four wireless communication devices 104 can also be rejected by one access message 876.

A controller 873 (e.g., an electronic processor) may be coupled to, and control the operation of, a receiver 813, a pager 871, a message generator 872 and a transmitter 811. The controller 873 may obtain instructions stored in a memory 805.

The receiver 813 may receive priority data 866. For example, the priority data 866 may be provided by a part of the wireless communication system 100 that manages or monitors the network (e.g., a system controller 110). In one configuration, a system controller 110 may provide the priority data 866 to the receiver 813. In this example, the system controller 110 monitors the number of available unused channels and is responsive to changes to the number of available unused channels. In one configuration, when the number of available unused channels drops below a specified number, the system controller 110 may provide the priority data 866 to the receiver 813.

The priority data 866 may include a set of priority values. When the base station 802 obtains a set of priority values, the message generator 872 may generate access restriction data 879 that indicates the set of priority values. For example, if a network has eight different priority levels, the priority data 866 may specify that priority values of 1-7 are present on the network. As another example, the priority data 866 may also specify that all wireless communication devices 104 with priority levels of 5 or higher be restricted from accessing the network. In other words, in one example, wireless communication devices 104 with a priority value of 1-4 may access the network while wireless communication devices 104 with a priority value of 5-8 may be restricted from accessing the network. In one configuration, the priority data 866 may include a priority level that will provide for optimal use of the network's resources. For example, the system controller 110 can determine the optimal use of the network resources and therefore instruct the base station 102 accordingly. For instance, based on the level of network congestion, the system controller 110 may determine that only wireless communication devices 104 with a certain priority level may access the network.

As another example, five classes of wireless communication devices 104 may exist with each class having a different associated priority value. The priority data 866 may indicate that multiple (e.g., two) priority values in a set of priority values correspond with two of the five classes of wireless communication devices 104. Thus, upon receiving a message (e.g., a paging message 875 and/or an access message 876) that includes access restriction data 879, the two groups of wireless communication devices 104 with the corresponding priority values may become restricted from communication channel access. In this way, the use of priority value sets may give greater flexibility to a base station 802 in restricting access to a communication channel because access may be restricted for multiple classes or types of wireless communication devices 104. This is because different subsets of wireless communication devices 104 in the wireless communication system 100 may have different associated priority values and one or more groups of wireless communication devices 104 may be restricted by the base station 802 using a single message.

The priority data 866 may include a priority value that is associated with at least one wireless communication device 104. In one configuration, the priority data 866 may include only a single priority value (indicating low priority). For example, there may be two states of congestion in a network: congested and not congested. The presence of priority data 866 may indicate that the network is congested. Alternatively, the priority data 866 may serve to indicate one or more priority values from a set of priority values.

The priority data 866 may indicate that a communication channel is congested. For example, the priority data 866 may include information indicating that access to a communication channel by wireless communication devices 104 should be restricted. For instance, the priority data 866 may include a priority value that indicates which wireless communication devices 104 should be restricted from access the communication channel.

The information in the priority data 866 may indicate a congestion condition of a network (e.g., network 100, 800). In one configuration, this may be accomplished by using a flag having two states (indicating congested or uncongested). The base station 802 may treat the congested flag as an indication that access to the communication channel is to be restricted for wireless communication devices 104 having a low priority value associated with them. In other words, the base station 802 may send a message to wireless communication devices 104 having a low priority value associated with them. The message may specify that the wireless communication devices 104 are restricted from accessing the communication channel. In some configurations, when a wireless communication device 104 obtains an uncongested flag, it may try to access the communication channel regardless of its priority value. In other configurations, the absence of a congested flag may indicate that any wireless communication device 104 may try to access the communication channel regardless of its priority value.

Additionally, the priority data 866 may serve to indicate a set of priority values. In this case, the priority data 866 serves to indicate that access to the communication channel is to be restricted for wireless communication devices 104 with a priority value in the set of priority values.

In some configurations, the priority value may be indicated by a combination of one or more bits. For example, three bits of the priority data 866 may provide one of up to eight priority values.

The priority data 866 may be stored in a database or a memory (not shown) elsewhere in the network and provided to the receiver 813. For example, the priority data 866 may be stored in the system controller 110 and provided by the system controller 110 to the receiver 813.

In some configurations, the base station 802 may store the priority values obtained from the priority data 866 in the memory 805. In this case, the priority values may be provided to the message generator 872 by the controller 873. Using the stored priority values, the receiver 813 may be pre-configured to operate accordingly without receiving additional priority values. In this manner, the base station 802 may receive data indicating a congestion condition of the network such as traffic control data 870 and generate a message based on that received data.

As an example, the base station 802 may receive a data flag indicating a congestion condition of the network. The controller 873 may send a priority value based on the received data to the message generator 872. The message generator 872 may generate a message with access restriction data 879.

The access restriction data 879 may indicate to wireless communication devices 104 that access to the communication channel is restricted.

The message generator 872 may be coupled to the receiver 813, the transmitter 811, the pager 871 and the controller 873. The message generator 872 may receive the priority data 866 from the receiver 813. The message generator 872 may use the priority data 866 to generate a message that includes access restriction data 879. As discussed above, access restriction data 879 is data that includes one or more priority values. If a wireless communication device 104 has a matching priority value to one in the access restriction data 879, the wireless communication device 104 may be restricted from accessing the communication channel.

In one configuration, the access restriction data 879 may indicate one or more wireless communication devices 104 that are restricted from accessing a communication channel (using the priority values in the access restriction data 879). In one example, if the access restriction data 879 does not include a specific priority level, the access restriction data 879 is, in effect, addressed to all wireless communication devices 104 that can receive the access restriction data 879. Alternatively, the access restriction data 879 may be addressed to all wireless communication devices 104 having a specific priority value.

The message generated by the message generator 872 may be a paging message 875 and/or an access message 876. The paging message 875 and the access message 876 may each be transmitted by the transmitter 811.

The message generator 872 may also generate access restriction data 879 that indicates a time interval during which some wireless communication devices 104 have restricted access to a communication channel. For example, a wireless communication device 104 may receive a paging message 875 and/or access message 876 that includes access restriction data 879 restricting the wireless communication device 104 from accessing a communication channel. The wireless communication device 104 may respond by waiting for a period of time, during which the wireless communication device 104 will not request access. For example, the period of time may be a range of 1 to 120 seconds, a range of 1 to 60 minutes, a range of 1 to 24 hours, a range of 1 to 15 days, or variations thereof. Once the period of time has elapsed, the wireless communication device 104 may then again request access to a communication channel.

The wireless communication device 104 may determine the period of time spent waiting based on a time interval indicated by the access restriction data 879. In one embodiment of the present invention, the period of time the wireless communication device 104 waits may be determined by generating a random time interval based on the time interval indicated by the access restriction data 879. The time interval indicated by the access restriction data 879 may be a time interval range.

The time interval may be stored in the memory 805 and provided to the message generator 872 by the controller 873. Alternatively the receiver 813 may provide the time interval directly to the message generator 872. The time interval may be received by the receiver 813 separately or along with the priority data 866. For example, the time interval and the priority data 866 may both be received from another device on the network, such as the system controller 110.

The time interval may be one of a set of time intervals. For example, the time interval may be a short time interval (e.g., seconds) or a longer time interval (e.g., minutes, hours or days). Such different time intervals allow the network to choose time intervals that are appropriate for various situations. For example, a shorter time interval is more appropriate when congestion is low, whereas a longer time interval is more appropriate when congestion is greater. When the time interval includes only one time interval, the message generator 872 may generate the access restriction data 879 to indicate the one time interval.

The time interval indicated by the message generator 872 may be a range of time intervals. For example, the access restriction data 879 may include information that indicates the time interval as a range of 1 to 120 seconds, a range of 1 to 60 minutes, a range of 1 to 24 hours, a range of 1 to 15 days, or variations thereof. A wireless communication device 104 that receives a paging message 875 and/or access message 876 that includes access restriction data 879 indicating a time interval range may then select a time interval from the indicated time interval range. For example, the access restriction data 879 may indicate the time interval as a range of time intervals between 1 minute and 60 minutes. The wireless communication device 104 may select a value from this range (e.g., 5 minutes). Various criteria may be used by the wireless communication device 104 to select the value. For example, the wireless communication device 104 may select the value using a random selection from the range of time intervals, such as by means of a random number generation algorithm. This may help to ensure fairness in the assignments of channels between multiple wireless communication devices 104 over a time period.

The communication channel indicated may be an access channel. Access to the communication channel may be restricted based on the access restriction data 879. A wireless communication device 104 may request access to the access channel by means of signaling. The communication channel may be an uplink and/or a downlink dedicated channel used to transfer useful data between wireless communication devices 104 and one or more base stations 802 of the wireless communication system 100.

The communication channel may also include a plurality of dedicated channels that are available for use by wireless communication devices 104 in the wireless communication system 100. The access restriction data 879 may indicate that wireless communication devices 104 that have the priority value associated with them have restricted access to any of the plurality of dedicated channels during a time interval. For example, the access restriction data 879 may indicate that access is restricted to all dedicated channels usable by wireless communication devices 104 for the time interval. A wireless communication device 104 receiving the paging message 875 and/or access message 876 that has the priority associated with a priority value in the received message may respond by delaying any attempt by the wireless communication device 104 to access a dedicated channel during the time interval.

The pager 871 may be coupled to the message generator 872. In one configuration, the pager 871 may receive the access restriction data 879 from the message generator 872. The pager 871 may generate a paging message 875 that includes the access restriction data 879. The paging message 875 may be addressed to at least one wireless communication device 104 that are associated with the priority value.

In one embodiment of the present invention, the transmitter 811 may be coupled to the pager 871. The transmitter 811 may transmit the paging message 875 via a paging channel. The paging channel may be a signaling channel that is also a broadcast channel. A broadcast channel is used to send signaling data in the form of broadcast messages to one or more wireless communication devices 104.

In some configurations, the paging channel is suitable for paging wireless communication devices 104 that are in a set of wireless communication devices 104. The pager 871 may address the paging message 875 to only a subset of the set of wireless communication devices 104. By using a paging channel, the network has the ability to control access of a group of wireless communication devices 104 to the network. For example, the receiver 813 may receive data indicating a paging group 867 that corresponds to the subset or group of wireless communication devices 104. Wireless communication devices 104 listening to messages addressed to a particular paging group 867 will have restricted access to the communication channel. For example, those wireless communication devices 104 listening to paging messages 875 addressed to the particular paging group 867 will be prevented from accessing the network for a specified time period.

The base station 802 can address the paging message 875 to one paging group 867 or multiple paging groups 867. This allows different subsets of wireless communication devices 104 to be prevented from accessing the network at different times. It also allows access to be controlled so that different numbers of wireless communication devices 104 make access attempts during different time periods. Because the paging group 867 can include a large number of wireless communication devices 104, it is possible to restrict access to the communication channel for a large number of wireless communication devices 104 using a single paging message 875.

The base station 102 may include access restriction data 879 in the paging message 875. The access restriction data 879 may be addressed to a wireless communication device 104 within a paging group 867. In other words, a paging message 875 with access restriction data 879 may be addressed to a wireless communication device 104 within a paging group 867.

The pager 871 and the transmitter 811 may transmit the paging message 875 during a paging occasion, which is a time interval associated with the paging group 867. Such a paging occasion typically repeats periodically.

Wireless communication devices 104 may switch to an idle mode (for example, to conserve power). During idle mode, wireless communication devices 104 generally do not transmit or receive data. However, wireless communication devices 104 may activate (i.e., switch from idle mode to active mode) upon receiving a page. In other words, wireless communication devices 104 in a paging group 867 that are in idle mode may activate their receivers to listen to the paging channel during the paging occasion.

The transmitter 811 may be coupled to the message generator 872. The transmitter 811 may transmit the access message 876. As discussed above, the access message 876 may be generated by the message generator 872 and may include the access restriction data 879. The access message 876 may be transmitted via the downlink access channel. The downlink access channel may be a signaling channel that is also a broadcast channel.

It should be understood that although the paging message 875 and/or access message 876 are generally transmitted in response to access data being received by the receiver 813, the paging message 875 and/or access message 876 may be transmitted independently of any access request data 868. In this case, the function of the paging message 875 and/or access message 876 does not include either granting or refusing access to the communication channel by a wireless communication device 104 that has requested access. That is, the paging message 875 and/or access message 876 may be transmitted either in response to a channel request received from a wireless communication device 104 requesting access or independent of any channel request.

In one embodiment of the present invention, when a wireless communication device 104 wants to connect to the communication channel, the wireless communication device 104 begins preparations to send a channel request message to the base station 102. The wireless communication device 104 may also activate a receiver to listen to the downlink access channel for the request to be granted or denied. The wireless communication device 104 continues to listen to the downlink access channel until at least the end of a time period after the transmission of the channel request.

The access restriction data 879 may be effectively addressed to all wireless communication devices 104 that can receive and process a message transmitted on the downlink access channel. However, only those wireless communication devices 104 that are listening to the downlink access channel will actually process access restriction data 879 that is received. In this manner, while only one wireless communication devices 104 makes a request to access the communication channel, multiple wireless communication devices 104 that receive and process the paging message 875 and/or the access request message 876 along with the access restriction data 879 may be restricted from accessing the communication channel.

The receiver 813 may also receive access request data 868 transmitted by a wireless communication device 104 via an uplink access channel. The access request data 868 serves to request access to a dedicated channel (e.g., a voice channel or another type of dedicated channel). The receiver 813 may provide the received access request data 868 to the message generator 872. In some instances, this may be done under the control of the controller 873. The message generator 872 may generate access grant data based on the access request data 868.

The receiver 813 also receives traffic control data 870 from one or more other elements of the network, such as the system controller 110 and provides the traffic control data to the controller 873. The traffic control data 870 may include information about traffic in the wireless communication system 100. This traffic information can include the status of traffic, such as traffic congestion levels. The traffic information may also include one or more commands provided by the system controller 110. Such a command may, for example, serve to indicate that congestion is at a particular level.

The controller 873 may instruct the message generator 872 to generate a paging message 875 and/or access message 876 based on the access request data 868 and/or the traffic control data 870. The paging message 875 and/or access message 876 may be directed to a wireless communication device 104 that has transmitted a channel request that includes the access request data 868 received by the receiver 813.

The controller 873 may instruct the transmitter 811 to transmit a paging message 875 and/or access message 876 that includes the access grant data. In some cases, this may depend on the traffic control data 870. The paging message 875 and/or access message 876 may be transmitted via the downlink access channel to grant or refuse access to a wireless communication device 104 that has transmitted a channel request with the access request data 868. The paging message 875 and/or access message 876 may include either an access grant message or an access reject message Access request data 868 may be provided to the transmitter 811 from the receiver 813 via the message generator 872. Access request data 868 may be included in a message generated by the message generator 872 (i.e., the paging message 875 and/or access message 876). The paging message 875 and/or access message 876 may serve to grant or refuse access to the wireless communication device 104 that has requested access.

The base station 802 may also receive dedicated data 869, such as traffic data. The receiver 813 may provide the received dedicated data 869 to the transmitter 811 under the control of the controller 873. The dedicated data 869 may be provided to the receiver 813 by another part of the wireless communication system 100, such as the system controller 110. The transmitter 811 may then transmit the dedicated data 869 as transmitted dedicated data 877 via a downlink dedicated channel. The transmitted dedicated data 877 may be received by one or more wireless communication devices 104.

The receiver 813 and message generator 872 may be included within the TX Data Processor 234. The controller 873 and the memory 805 may correspond to the controller/processor 214 and the memory 216 discussed in connection with FIG. 2, respectively.

Figure 9:
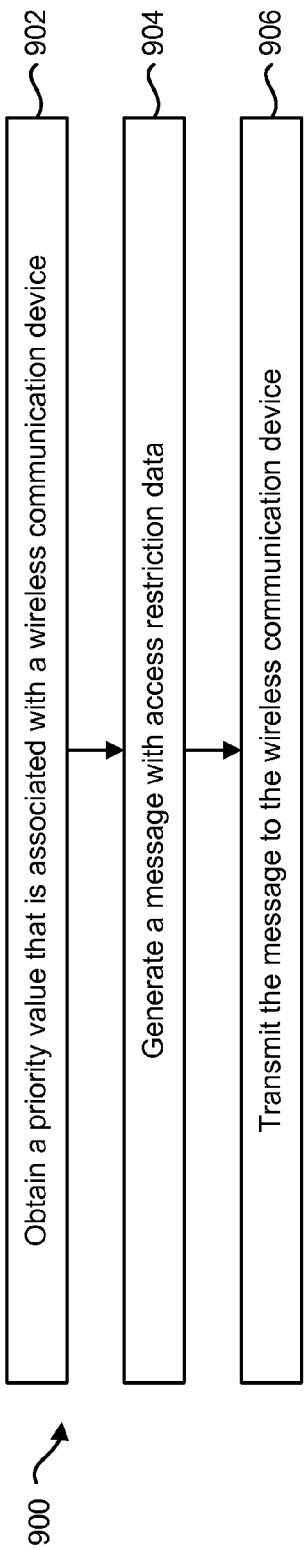
FIG. 9 is a flow diagram of a method for transmitting a message with access restriction data according to some embodiments of the present invention.

FIG. 9 is a flow diagram of a method 900 for transmitting a message with access restriction data 879 according to some embodiments of the present invention. The method 900 may be performed by a base station 802 or some other similar access point. The base station 802 may obtain 902 a priority value that is associated with a wireless communication device 104. The priority value may indicate that access to a communication channel is to be restricted for wireless communication devices 104 having the priority value. In some configurations, the presence of the priority value may indicate a low priority value. The priority value may be included in priority data 866.

The priority value may be indicated by a combination of one or more bits. The priority value may be received by a part of the wireless communication network, such as from the system controller 110. The system controller 110 may monitor the number of available unused channels. The system controller 110 may be responsive to the number of available unused channels. The system controller 110 may provide the priority value to a base station 802 to indicate that access is to be restricted for low-priority wireless communication devices 104 when the number of available channels drops below a specified number.

In one embodiment of the present invention, the obtained priority value may indicate a congestion condition of the network. For example, a flag having two states may indicate the presence congested as true or false. The priority value may also serve to indicate that access to the communication channel is to be restricted for low-priority wireless communication devices 104.

The base station 802 may generate 904 a message with access restriction data 879. The message may be addressed to one or more wireless communication devices 104. The message may be based on the obtained priority value. The access restriction data 879 may indicate a group of wireless communication devices 104 associated with the priority value. The access restriction data 879 may also indicate that the group of wireless communication devices 104 is to have restricted access to a communication channel. In other words, the access restriction data 879 indicates that wireless communication devices 104 that have a priority value associated with them have restricted access to the communication channel. The message may be a paging message 875 or an access message 876.

In some configurations, the priority value indicates low priority, as compared to high priority, and the access restriction data 879 therefore indicates that wireless communication devices 104 that have the low priority value associated with them have restricted access to the communication channel. The communication channel may be an uplink channel used to transfer data from wireless communication devices 104 to base stations 102 of the wireless communication system 100.

The base station 802 may transmit 906 the message to the wireless communication device 104. The message may be a paging message 875 and/or an access message 876. The message may include the access restriction data 879. The access restriction data 879 may be addressed to at least one wireless communication device 104 having the priority value associated with it.

In one embodiment of the present invention, an addressed wireless communication device 104 may belong to a paging group 867. A paging group 867 is a group of wireless communication devices 104 to which the paging message 875 is addressed. The paging message 875 may be transmitted via a paging channel.

In some configurations, an addressed wireless communication device 104 may be accessible via an access channel. In other words, the access message 876 may be transmitted via the access channel.

Figure 10:
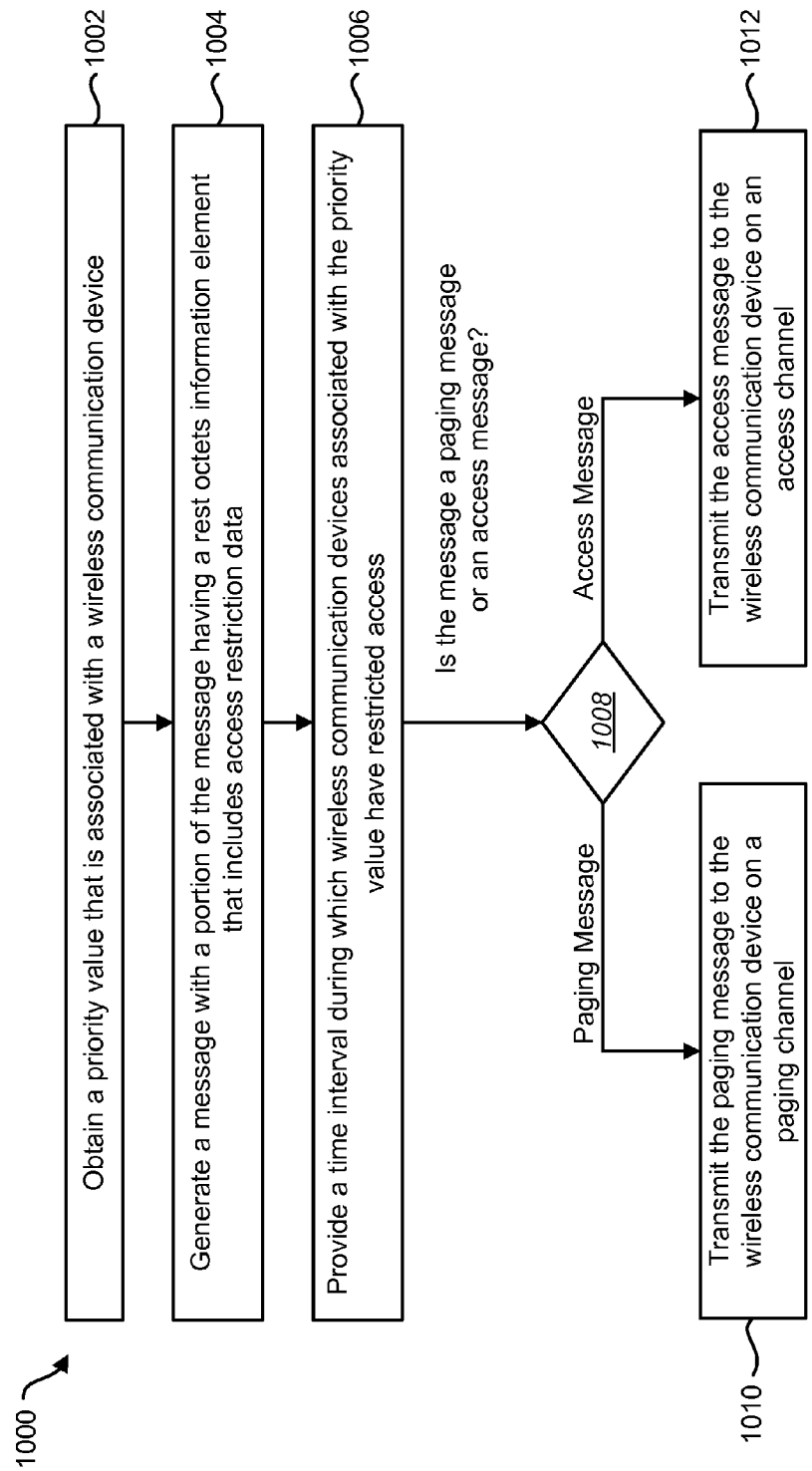
FIG. 10 is a flow diagram of another method for transmitting a message with access restriction data according to some embodiments of the present invention.

FIG. 10 is a flow diagram of another method 1000 for transmitting a message with access restriction data 879 according to some embodiments of the present invention. The method may be performed by a base station 802. The base station 802 may obtain 1002 a priority value that is associated with a wireless communication device 104. For example, the priority value may be received from system controller 110 on the wireless communication system 100. The priority value may indicate the presence of congestion on the network. The priority value may be obtained 1002 from priority data 866.

The base station 802 may generate 1004 a message with a portion of the message having a rest octets information element that includes access restriction data 879. The access restriction data 879 may address one or more wireless communication devices 104. Rest octets information elements are information elements transmitted in a compressed form (e.g., Concrete Syntax Notation One (CSN.1). Rest octets information elements will be described below in additional detail in connection with Listings (1)-(10).

The base station 802 may provide 1006 a time interval during which wireless communication devices 104 associated with the priority value have restricted access. In one embodiment of the present invention, the base station 802 may provide 1006 the time interval in the access restriction data 879. The time interval may be one of a set of time intervals. For example, the time interval may be a short time interval (e.g., seconds) or it may be a longer time interval (e.g., minutes, hours or days). Such different time intervals allow the network to choose time intervals that are appropriate for various situations. For example, a shorter time interval is more appropriate when congestion is low, whereas a longer time interval is more appropriate when congestion is greater.

The base station 802 may determine 1008 if the message is a paging message 875 or an access message 876. If the message is a paging message 875, the base station 802 may transmit 1010 the paging message 875 on a paging channel. If the message is an access message 876, the base station 802 may transmit 1012 the access message 876 on an access channel.

Figure 11:
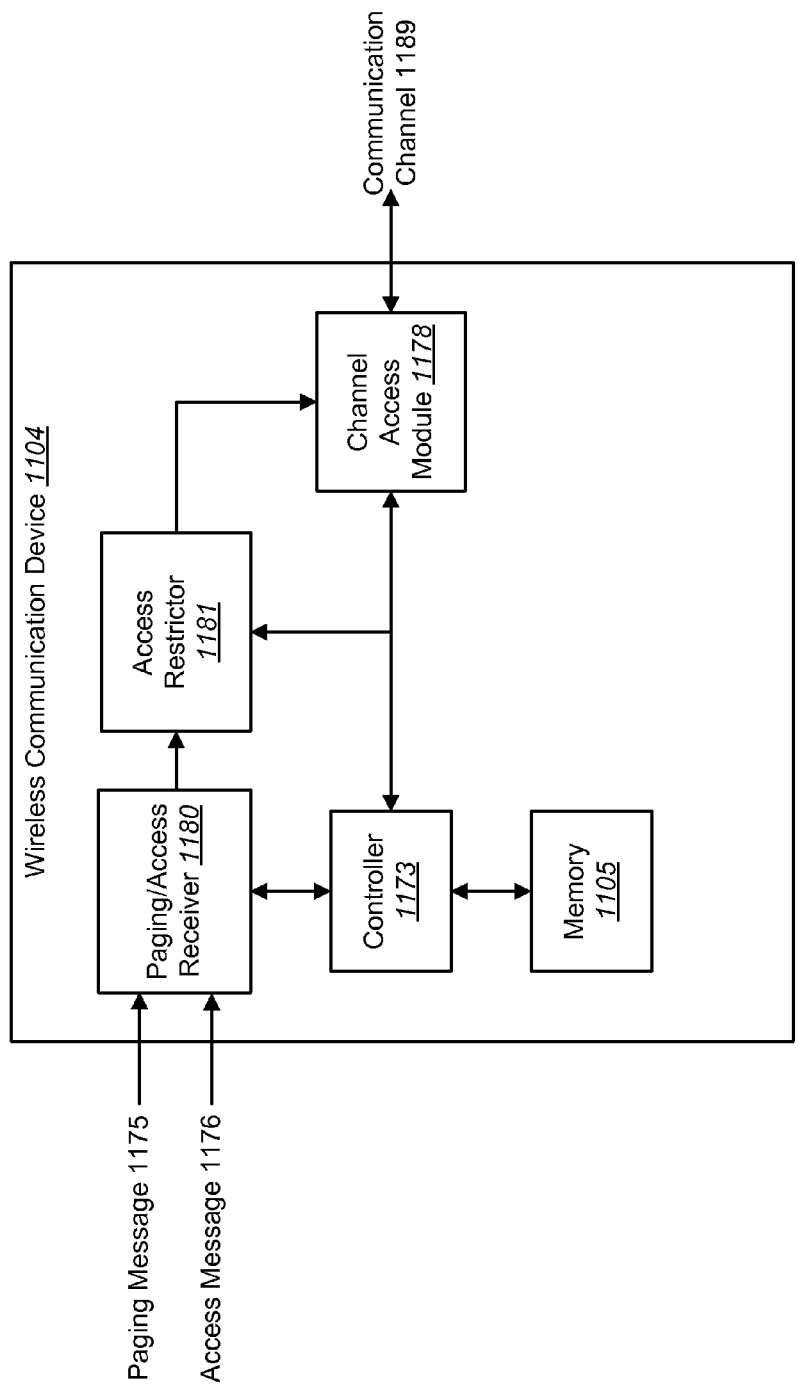
FIG. 11 is a block diagram illustrating one configuration a wireless communication device in which embodiments of the present invention disclosed herein may be utilized.

FIG. 11 is a block diagram illustrating one configuration a wireless communication device 1104 in which embodiments of the present invention disclosed herein may be utilized. The wireless communication device 1104 of FIG. 11 may be one example of the wireless communication devices 104 described above in connection with FIG. 1. The wireless communication device 1104 may include a paging/access receiver 1180, a controller 1173, memory 1105, an access restrictor 1181 and a channel access module 1178.

The wireless communication device 1104 may receive and process a paging message 1175 and/or access message 1176. For example, the paging message 1175 and/or access message 1176 may be received from a base station 802. In one embodiment of the present invention, the paging message 1175 and/or the access message 1176 may be received by the paging/access receiver 1180. The paging/access receiver 1180 may be included within the RX data processor 228, discussed in connection with FIG. 2.

The controller 1173 may control operation of the paging/access receiver 1180, the channel access module 1178 and the access restrictor 1181. The controller 1173 may obtain instructions stored in the memory 1105. The controller 1173 and the memory 1105 may correspond to the controller/processor 230 and the memory 236 discussed in connection with FIG. 2, respectively.

The paging/access receiver 1180 may receive the access message 1176 via the downlink access channel. The paging/access receiver 1180 may receive the paging message 1175 via the paging channel. The received message (i.e., paging message 1175 and/or access message 1176) may include the access restriction data 879. The access restriction data 879 may indicate a priority value that restricts access for the wireless communication device 1104 to a communication channel 1189. In other words, if a wireless communication device 1104 has a priority value associated with it that matches the priority value indicated in the access restriction data 879, then the wireless communication device 1104 may have restricted access to the communication channel 1189.

The communication channel 1189 can be any channel used for communication between the wireless communication device 1104 and the wireless communication system 100. Typically the communication channel 1189 is a traffic channel, such as a dedicated channel, as discussed above.

In one embodiment of the present invention, the access restriction data 879 may include information (e.g., a flag having one or more bits) that has one, two or more priority values. One value may indicate a first priority value and another value may indicate a second priority value. Alternatively the mere presence of the access restriction data 879 may serve to indicate a priority value (e.g., low priority). In this case, the access restriction data 879 serves to indicate that wireless communication devices 104 with low priority have restricted access to the communication channel 1189.

The channel access module 1178 may be coupled to the controller 1173 and the access restrictor 1181. The channel access module 1178 may allow the wireless communication device 1104 to access the communication channel 1189. For example, the channel access module 1178 may include a receiver and/or a transmitter to receive and transmit signals via the communication channel 1189. The communication channel 1189 may be a downlink channel or an uplink channel.

The access restrictor 1181 is coupled to the channel access module 1178 and to the paging/access receiver 1180. The access restrictor 1181 may restrict or suspend access to the communication channel 1189 by the channel access module 1178, based on the indication provided by the access restriction data 879 received in the paging message 1175 and/or access message 1176. The access restrictor 1181 thus prevents the channel access module 1178 from accessing the communication channel 1189 based on the access restriction data 879. For example, the access restrictor 1181 may instruct the channel access module 1178 to disable the receiver and/or transmitter of the channel access module 1178. This allows the channel access module 1178 to consume less power and reduce congestion of the communication channel 1189.

The wireless communication device 1104 may include a stored priority value within the memory 1105. The access restrictor 1181 may compare the stored priority value with the priority value indicated by the access restriction data 879 within the paging message 1175 and/or access message 1176. The access restrictor 1181 may restrict and/or suspend access to the communication channel 1189 by the wireless communication device 1104 when the priority value indicated by the access restriction data 879 includes the stored priority value.

In one embodiment of the present invention, the wireless communication device 1104 may receive both the priority value in the access restriction data 879 and an assigned priority value. The assigned priority value may be assigned by the system controller 110, for example. The assigned priority value may be stored on the wireless communication device 1104 as the stored priority value and used by the access restrictor 1181. For example, the assigned priority value may be included in the paging message 1175 and/or access message 1176 or in another message addressed to the wireless communication device 1104. The message may assign an updated priority value to the wireless communication device 1104. Additionally, the assigned priority value may be addressed to one or more wireless communication devices 104.

Figure 12:
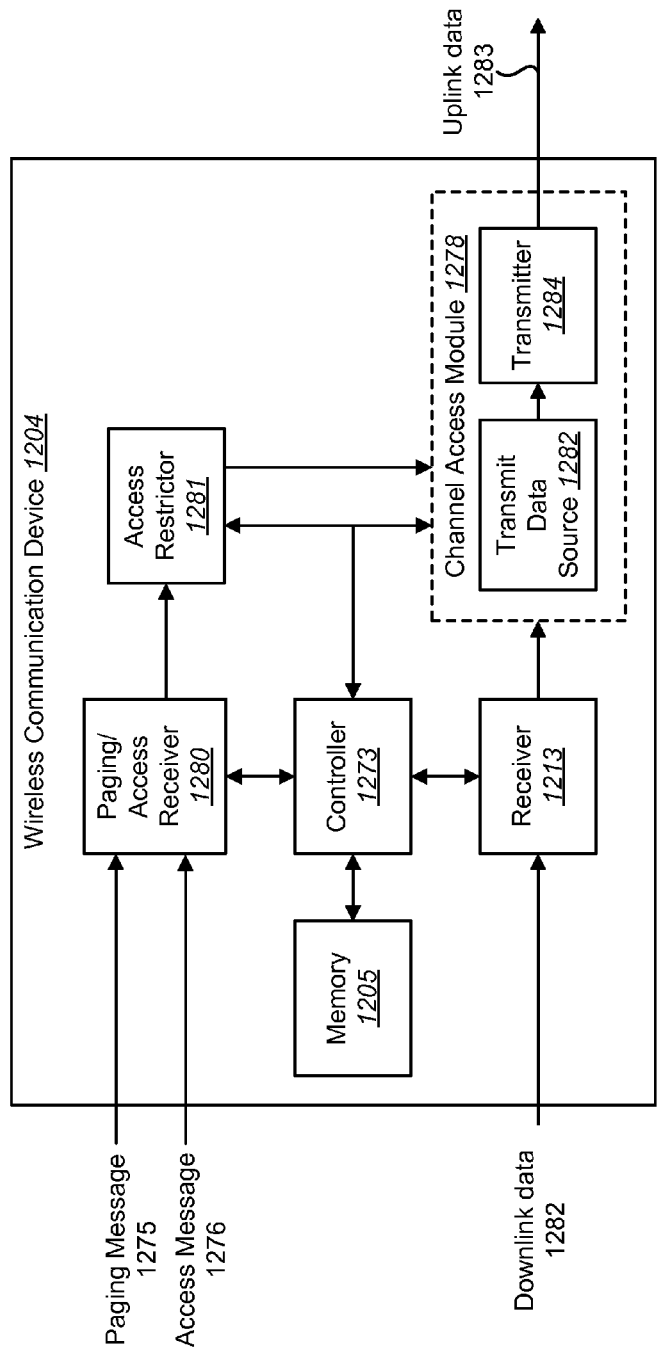
FIG. 12 is a block diagram illustrating a more detailed configuration of a wireless communication device according to some embodiments of the present invention.

FIG. 12 is a block diagram illustrating a more detailed configuration of a wireless communication device 1204 according to some embodiments of the present invention. The wireless communication device 1204 of FIG. 12 may be one example of the wireless communication devices 104 described above in connection with FIG. 1. The wireless communication device 1204 may include a paging/access receiver 1280, a channel access module 1278, an access restrictor 1281, a controller 1273 and memory 1205.

In one embodiment of the present invention, the channel access module 1278 may access a communication channel 1189. For example, the channel access module 1278 may transmit signals via an uplink communication channel. The channel access module 1278 may include a transmit data source 1282 and a transmitter 1284 for transmitting uplink data 1283 in an uplink signal via the uplink communication channel 1189.

The access restrictor 1281 may suspend or restrict the channel access module 1278 from accessing the communication channel 1189 by preventing the channel access module 1278 from transmitting the uplink data 1283. In one configuration, the access restrictor 1281 may disable the transmit data source 1282 in the channel access module 1278, preventing the transmit data source 1282 from providing transmit data to the transmitter 1284. In another configuration, the access restrictor 1281 may disable the transmitter 1284, preventing the transmitter 1284 from transmitting uplink data 1283. In yet another configuration, the access restrictor 1281 may disable both the transmit data source 1282 and the transmitter 1284, thus saving resources and reducing power consumption of the channel access module 1278.

The transmit data source 1282 may include a message generator 872 for generating uplink data 1283 (such as an access request message). The access request message may request access to a communication channel 1189 from a base station 102. In other words, the wireless communication device 1204 may request access to the communication channel 1189 by sending an access request message to the base station 102.

The wireless communication device 1204 may transmit the access request message as uplink data 1283 via the uplink communication channel 1189. If there is no reply from the base station 102, multiple access request messages may be sent. However, if the wireless communication device 1204 receives access restriction data 879 that instruct the wireless communication device 1204 to suspend access requests, the access restrictor 1281 may prevent the channel access module 1278 from transmitting access request messages and/or from sending the uplink data 1283 via the uplink communication channel 1189.

A receiver 1213 may be coupled to the controller 1273 and the channel access module 1278. The receiver 1213 may receive downlink data 1285 directed to the wireless communication device 1204 via a downlink communication channel 1189. In one configuration, the access restrictor 1281 may de-activate the receiver 1213. In this manner, resource usage in the wireless communication device 1204 may be reduced. De-activating the receiver 1213 may also reduce processing and power consumption in the receiver 1213.

Both the paging/access receiver 1280 that receives the paging message 1275 and/or access message 1276 and the receiver 1213 that receives the downlink data 1282 may be part of a single receiver controlled by the controller 1273. In other words, the single receiver may receive the paging message 1275 and/or access message 1276 and downlink data 1282.

In one embodiment of the present invention, the access restrictor 1281 may deactivate the receiver 1213 during the time interval for which access to the communication channel 1189 is restricted. The wireless communication device 1204 may determine the period of time the wireless communication device 1204 is to spend waiting based on the time interval indicated by the access restriction data 879. In one configuration, the period of time the wireless communication device 1204 waits may be determined by generating a random time value based on the time interval indicated by the access restriction data 879.

The controller 1273 may be coupled to and may control the paging/access receiver 1280, the receiver 1213, the access restrictor 1281, the transmit data source 1282 and the transmitter 1284. The controller 1273 may obtain instructions from the memory 1205. The controller 1273 and the memory 1205 may correspond to the controller/processor 230 and the memory 236 discussed in connection with FIG. 2, respectively.

Figure 13:
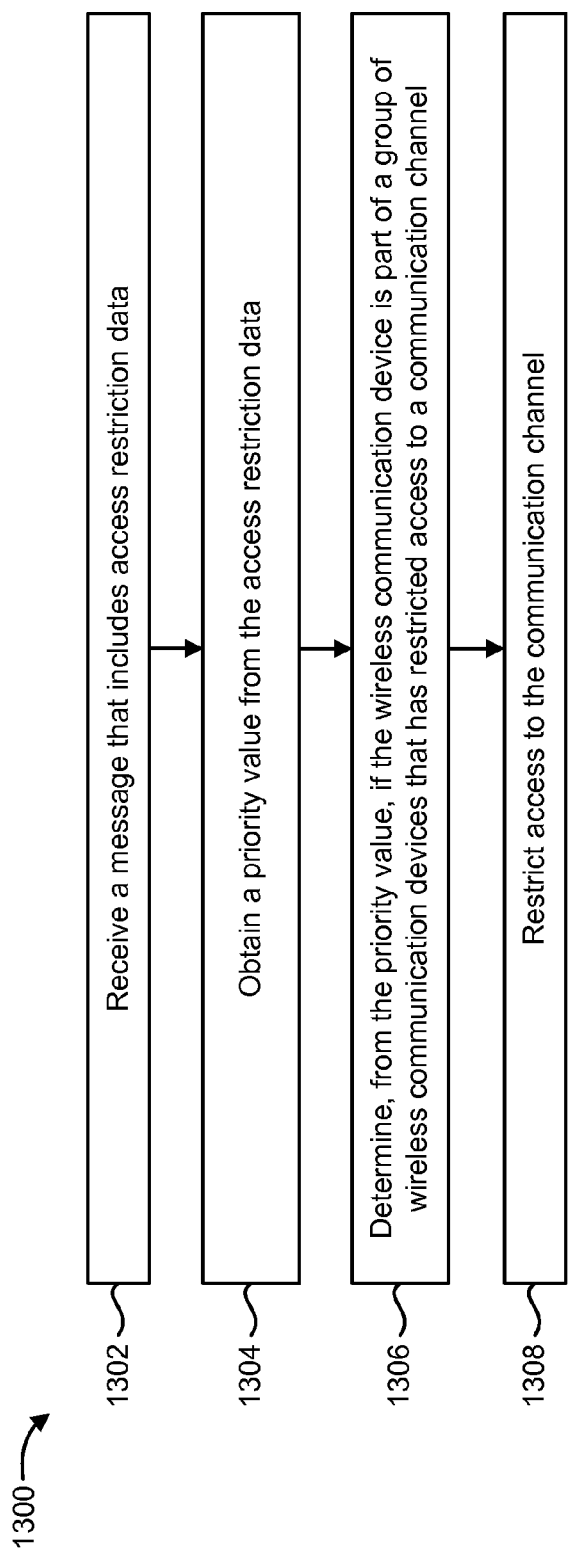
FIG. 13 is a flow diagram of a method for receiving a message with access restriction data according to some embodiments of the present invention.

FIG. 13 is a flow diagram of a method 1300 for receiving a message with access restriction data 879 according to some embodiments of the present invention. The method 1300 may be performed by a wireless communication device 1104.

The wireless communication device 1104 may receive 1302 a message that includes access restriction data 879. The message may be a paging message 1175 and/or an access message 1176.

The wireless communication device 1104 may obtain 1304 a priority value from the access restriction data 879. The access restriction data 879 may indicate a priority value that is associated with a wireless communication device 1104 or a group of wireless communication devices 104. In other words, the priority value may indicate that access to a communication channel 1189 is to be restricted for wireless communication devices 104 having an associated priority value. In some configurations, the presence of the priority value itself may indicate a low priority value (e.g., that access to the communication channel 1189 is to be restricted and/or suspended).

The wireless communication device 1104 may determine 1306, from the priority value, if it is part of a group of wireless communication devices 1104 that has restricted access to a communication channel 1189. In some configurations, the access restriction data 879 may not be addressed to any specific wireless communication device 104 or any group of wireless communication devices 104. As a result, the access restriction data 879 is, in effect, addressed to all wireless communication devices 104 that can receive the access restriction data 879.

The wireless communication device 1104 may restrict 1308 access to the communication channel 1189. Restriction may be based on the indication provided by the access restriction data 879. In one configuration, one group of wireless communication devices 104 with a lower priority value may restrict and/or suspend access to the communication channel 1189 while another group of wireless communication devices 104 with a higher priority level may be granted access.

Figure 14:
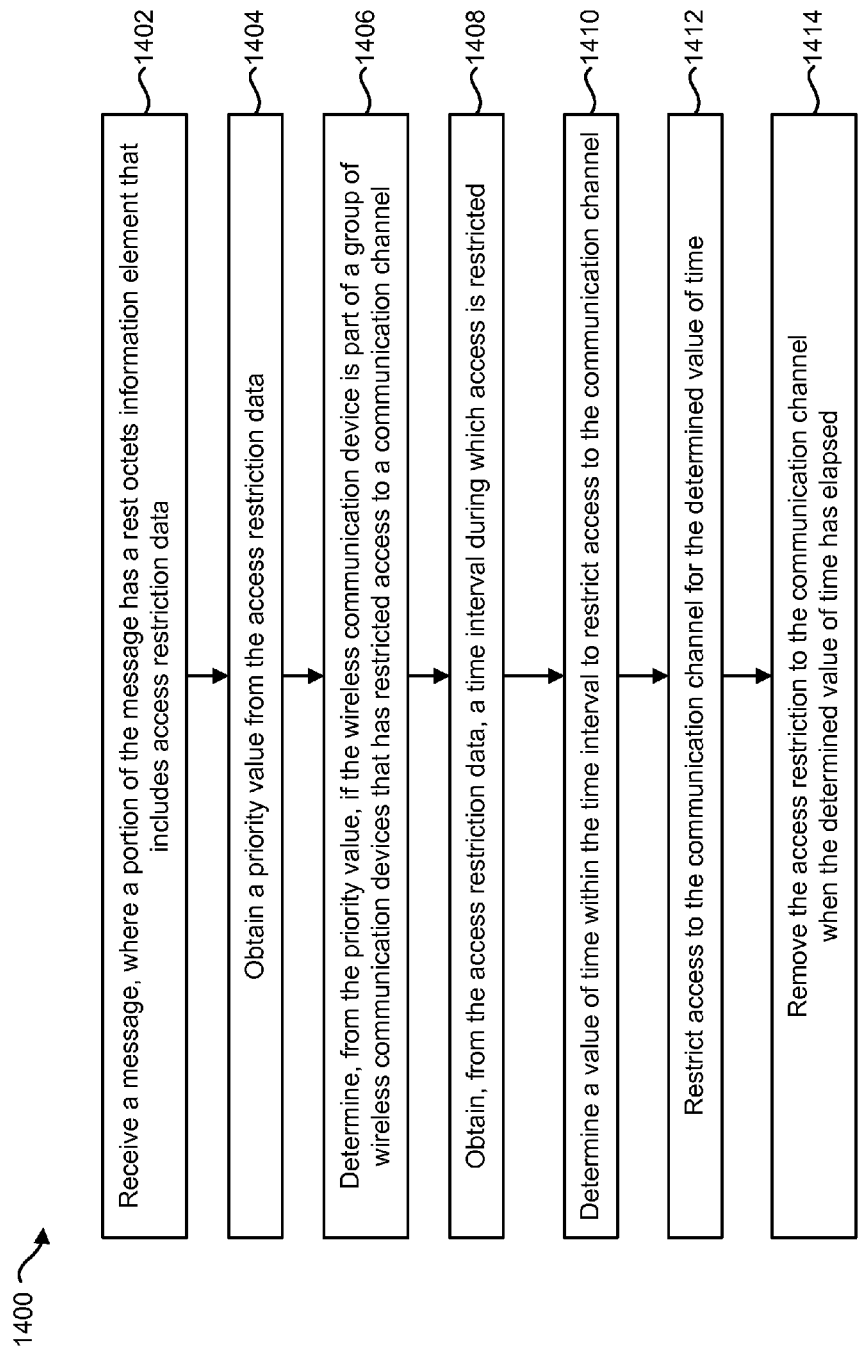
FIG. 14 is a flow diagram of another method for receiving a message with access restriction data according to some embodiments of the present invention.

FIG. 14 is a flow diagram of another method 1400 for receiving a message with access restriction data 879 according to some embodiments of the present invention. The method 1400 may be performed by a wireless communication device 1104.

The wireless communication device 1104 may receive 1402 a message. The message may be a paging message 1175 and/or an access message 1176. A portion of the message may have a rest octets information element that includes access restriction data 879. Rest octets information elements will be described below in additional detail in connection with Listings (1) through (10).

The wireless communication device 1104 may obtain 1404 a priority value from the access restriction data 879. The wireless communication device 1104 may determine 1406, from the priority value, if it is part of a group of wireless communication devices 1104 that has restricted access to a communication channel. The group of wireless communication devices 104 may include one or more wireless communication devices 1104. In some configurations, the group of wireless communication devices 104 may be a paging group 867.

The wireless communication device 1104 may obtain 1408, from the access restriction data 879, a time interval during which access is restricted. For example, access to the communication channel 1189 may be temporarily restricted and/or suspended for the group of wireless communication devices 104 for a period of time. The time interval may be indicated by the message. In some configurations, the time interval may be a set of various time interval ranges. For example, the message may include access restriction data 879 that indicates the time interval as a range of 1 to 120 seconds, a range of 1 to 60 minutes, a range of 1 to 24 hours, a range of 1 to 15 days, etc.

The wireless communication device 1104 may determine 1410 a value of time within the time interval to restrict access to the communication channel. For example, the wireless communication device 1104 may determine the value of time the wireless communication device 1104 spends waiting. The value of time may be based on the time interval indicated by the access restriction data 879. In one configuration, the value of time the wireless communication device 1104 waits may be determined by generating a random time interval based on the time interval indicated by the access restriction data 879. In one embodiment of the present invention, the time interval indicated by the access restriction data 879 may be a time interval range.

The wireless communication device 1104 may restrict 1412 access to the communication channel 1189. The restriction may be based on the indication provided by the access restriction data 879. For example, the wireless communication device 1104 may be restricted from making requests to access the communication channel 1189 for a period of time (e.g., value of time). The period of time may the value of time determined by the wireless communication device 1104.

The wireless communication device 1104 may remove 1414 the access restriction to the communication channel 1189 when the determined value of time has passed. (i.e., elapsed). In other words, once the value of time determined by the wireless communication device 1104 has elapsed, the wireless communication device 1104 may again request access to the communication channel 1189. In this way, network congestion to the communication channel 1189 may be reduced. Additionally, processing and power consumption of the wireless communication device 1104 may also be reduced.

Exemplary Tables and Listings

The systems and methods described herein can be applied to a wireless communication system 100 that operates according to GSM/EDGE Radio Access Network (GERAN) standards. For example, a group of wireless communication devices 104 can be controlled even if they have not made an access attempt (i.e., transmitted a channel request message). In this manner, un-necessary access attempts by devices that would be rejected by the network anyway due to congestion of the network may be avoided.

A wireless communication device 104 of a GERAN wireless communication system 100 may transmit a channel request message via an access channel known as a random access channel (RACCH). The access restriction data 879 may be added to one or more of the following paging and/or access messages as rest octets information elements.

In some configurations, paging rest octets information elements may be added to a paging message 875. These rest octets information elements may include PAGING REQUEST TYPE 1 message rest octets, PAGING REQUEST TYPE 2 message rest octets and/or PAGING REQUEST TYPE 3 message rest octets. Known paging request type 1, 2 and 3 rest octets are detailed in specification 3GPP TS 44.018 (Release 9), section 10.5.2.

The access restriction data 879 may act as rejection data and may deny access to one or more wireless communication devices 104. Under this approach, the network can prevent wireless communication devices 104 from initiating access and can avoid unnecessary use of the random access channel.

The maximum time to deliver the reject information to the devices is governed by the paging period used in the cell, which can range from 480 milliseconds to 2118 milliseconds. The minimum time can be 20 milliseconds, (i.e., the time it takes to deliver the paging message).

Details of the paging request rest octets information elements are provided in greater detail below. For each rest octets information element, a pseudo-code listing is given that describes the components of the rest octets information element.

The PAGING REQUEST TYPE 1 message rest octets (P1 Rest Octets) information element includes information about the status of information on an existing notification channel (NCH), priority levels, notification and packet page indications applied for mobile station identities, Multimedia Broadcast Multicast Service (MBMS) Notifications, a segment of an Earthquake and Tsunami Warning System (ETWS) Primary Notification message and spare bits.

The P1 Rest Octets information element is a type 5 information element with 0-17 octets length. The P1 Rest Octets information element is listed in pseudo-code in Listing (1) below. Note that modifications are denoted in bold type face. Listing (1):

Listing (1)

```
{ <   P1 Rest Octets > ::=
{L I H < NLN(PCH) : bit (2) > < NLN status(PCH) : bit >}
{L I H < Priority1 ::= Priority >}
{L I H < Priority2 ::= Priority >}
{L | H < Group Call information >1
< Packet Page Indication 1 : {L I H} >
< Packet Page Indication 2 : {L I H} >
{    null           | L         -- Receiver compatible with earlier release
                    | H                      -- Additions in Release 6 :
         { 0 | 1
                    {    00       < CELL_GLOBAL_COUNT:bit(2) >
                         | 01     < CELL_GLOBAL_COUNT:bit(2) >
                                  < VSTK_RAND : bit (36) >
                         | 10     < Reduced_GCR : bit (28) >
                                  < VSTK_RAND : bit (36) >
                         | 11     < CELL_GLOBAL_COUNT:bit(2) >
                                  < Reduced_GCR : bit (28) >
                                  < VSTK_RAND : bit (36) >
                    }
         }
         { 0 | 1             -- MBMS parameters included
                    {    0            -- MBMS pre-notification
                         I 1          -- MBMS notification
                                  <MBMS Notification 1 : <MBMS Channel Parameters IE
                                  >>}
                    {    0            -- MBMS pre-notification
                         I 1          -- MBMS notification
                                  <MBMS Notification 2 : { 0 | 1< MBMS Channel
                                  Parameters IE > } > }
                                       '0' indicates that the same MBMS Channel
                                       Parameters as for MBMS Notification 1 apply
         { 0 | 1 <MBMS Information> }
    }
}
```

Listing (1)

```
{  null         | L    -- Receiver compatible with earlier release
                | H         -- Additions in Release 7 :
                { 0 | 1 <AMR Config:bit(4)> }
}
{  null         | L    -- Receiver compatible with earlier release
                | H         -- Additions in Release 8
                < Priority Uplink Access : bit >
                { 0 | 1 < ETWS Primary Notification : < ETWS Primary Notification
                struct >> }
}
{  null         | L    -- Receiver compatible with earlier release
                | H         -- Additions in Release 10
                < REJECT ALL LOW PRIORITY DEVICES : bit (2) >
}
< spare padding >;
} //       -- truncation according to sub-clause 8.9 is allowed, bits "L" assumed.
```

Listing (1) includes REJECT ALL LOW PRIORITY DEVICES, which is a 2 bit field. The presence of this field implies that all low priority devices that are making or attempting to make access are rejected and these devices are to wait for a random period defined as shown in Table 1 below.

TABLE 1

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

The PAGING REQUEST TYPE 2 message rest octets (P2 Rest Octets) information element includes information on the channel needed by the network and information about the status of information on an existing notification channel (NCH), priority levels and packet page indications applied for mobile station identities, Multimedia Broadcast Multicast Service (MBMS) Notification and spare bits.

The P2 Rest Octets information element is a type 5 information element with 1-11 octets length. The P2 Rest Octets information element is listed in pseudo-code in Listing (2) below. Note that modifications are denoted in bold type face. Listing (2):

Listing (2)

```
{   <P2 Rest Octets> ::=
    {L I H <CN3: bit (2)>}
    {L I H <NLN(PCH) : bit (2)> <NLN status(PCH) : bit>}
    {L I H <Priority1 ::= Priority>}
    {L I H <Priority2 ::= Priority>}
    {L I H <Priority3 ::= Priority>}
    < Packet Page Indication 3 : {L | H} >
    { null  | L         -- Receiver compatible with earlier release
            | H         -- Additions in Release 6 :
        { 0 I 1 -- MBMS parameters included
            {   0       -- MBMS pre-notification
                I 1     -- MBMS notification
                <MBMS Notification 3 : < MBMS Channel
                Parameters IE >> }
            { 0 | 1 < MBMS Information > }
        }
    }
```

```
{  null  | L       -- Receiver compatible with earlier release
         | H                -- Additions in Release 10
         < REJECT ALL LOW PRIORITY DEVICES : bit (2) >
}
<spare padding>;
} // -- truncation according to sub-clause 8.9 is allowed, bits 'L' assumed.
```

Listing (2) includes REJECT ALL LOW PRIORITY DEVICES, which is a 2 bit field. The presence of this field implies that all low priority devices that are making or attempting to make access are rejected and these devices are to wait for a random period defined as shown in Table 2 below.

TABLE 2

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

The PAGING REQUEST TYPE 3 message rest octets (P3 Rest Octets) information element includes information on the channel needed by the network and information about the status of information on an existing notification channel (NCH), priority levels applied for mobile station identities and spare bits. The purpose of the spare bits is to allow the upward compatible introduction of new information on the paging channel (PCH) in later phases.

The P3 Rest Octets information element is a type 5 information element with 3 octets length. The P3 Rest Octets information element is listed in pseudo-code in Listing (3) below. Note that modifications are denoted in bold type face. Listing (3):

Listing (3)

```
< P3 Rest Octets > ::=
    { L I H < CN3 : bit (2) > < CN4 : bit (2) > }
    { L I H < NLN(PCH) : bit (2) > < NLN status(PCH) : bit > }
    { L I H < Priority1 ::= Priority > }
    { L I H < Priority2 ::= Priority > }
    { L I H < Priority3 ::= Priority > }
    { L I H < Priority4 ::= Priority > }
    { null  | L  -- Receiver compatible with earlier release
            | H  -- Additions in Release 10
                < REJECT ALL LOW PRIORITY DEVICES : bit (2) >
    }
    < spare padding >;
} //  -- truncation according to sub-clause 8.9 is allowed, bits 'L' assumed.
```

Listing (3) includes REJECT ALL LOW PRIORITY DEVICES, which is a 2 bit field. The presence of this field implies that all low priority devices that are making or attempting to make access are rejected and these devices are to wait for a random period defined as shown in Table 3 below.

TABLE 3

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

In addition to the approach described above, for each paging rest octets (P1 Rest Octets, P2 Rest Octets and P3 Rest Octets) alternative approaches may be employed. One alternative approach is for the network to signal which priority group or access group are rejected from making an access attempt. This approach may also be applied with P1 Rest Octets and P2 Rest Octets. Listing (4) below illustrates, in pseudo-code, how this alternative approach is applied to the P3 Rest Octets information element to produce a modified P3 Rest Octets information element. The pseudo-code listings for the P1 and P2 Rest Octets information elements can be modified in a similar fashion. Note that modifications are denoted in bold type face. Listing (4):

Listing (4)

```
< P3 Rest Octets > ::=
    { L I H < CN3 : bit (2) > < CN4 : bit (2) > }
    { L I H < NLN(PCH) : bit (2) > < NLN status(PCH) : bit > }
    { L I H < Priority1 ::= Priority > }
    { L I H < Priority2 ::= Priority > }
    { L I H < Priority3 ::= Priority > }
    { L I H < Priority4 ::= Priority > }
    { null  | L  -- Receiver compatible with earlier release
            | H  -- Additions in Release 10
                {   0 | 1 < REJECT ALL PRIORITY 0 DEVICES :
                          bit (2) >
                    0 | 1 < REJECT ALL PRIORITY 1 DEVICES :
                          bit (2) >
                    ....
                    0 | 1 < REJECT ALL PRIORITY n DEVICES :
                          bit (2) >
                }
    }
    < spare padding >;
} //  -- truncation according to sub-clause 8.9 is allowed, bits 'L' assumed.
```

Listing (4) includes REJECT ALL PRIORITY X DEVICES, which is a 2 bit field. The presence of this field implies that all priority x devices that are making or attempting to make access are rejected and these devices are to wait for a random period defined as shown in Table 4 below. The value of x is [0 . . . n].

TABLE 4

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Another alternative approach is for the network to signal which priority group or access group are rejected from making an access as shown below. This approach can also be applied with P1 Rest Octets and P2 Rest Octets. The pseudo-code listing in Listing (5) below illustrates how this alternative approach is applied. Note that modifications are denoted in bold type face. Listing (5):

Listing (5)

```
< P3 Rest Octets > ::=
    { L I H < CN3 : bit (2) > < CN4 : bit (2) > }
    { L I H < NLN(PCH) : bit (2) > < NLN status(PCH) : bit > }
    { L I H < Priority1 ::= Priority > }
    { L I H < Priority2 ::= Priority > }
    { L I H < Priority3 ::= Priority > }
    { L I H < Priority4 ::= Priority > }
    { null  | L  -- Receiver compatible with earlier release
            | H  -- Additions in Release 10
                < REJECTED PRIORITIES: bit (3) >
                < REJECT PERIOD : bit (2) >
    }
    < spare padding >;
} //  -- truncation according to sub-clause 8.9 is allowed, bits 'L' assumed.
```

Listing (5) includes REJECT PRIORITY, which is a 3 bit field. The code of this 3 bit field is as defined as shown in Table 5 below.

TABLE 5

| Bit | | Indication |
|---|---|---|
| 2 | 1 | |
| 0 | 0 | Reject timer selected randomly from a range 1 to 120 seconds, with resolution of 1 second |

TABLE 5-continued

| Bit | | |
|---|---|---|
| 2 | 1 | Indication |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Listing (5) also includes REJECT PERIOD, which is a 2 bit field. The code of this 2 bit field is as defined as shown in Table 6 below.

TABLE 6

| Bit | | | |
|---|---|---|---|
| 3 | 2 | 1 | Indication |
| 0 | 0 | 0 | All devices with priority 0 are rejected for period defined by REJECT PERIOD |
| 0 | 0 | 1 | All devices with priority 1 and lower are rejected defined by REJECT PERIOD |
| 0 | 1 | 0 | All devices with priority 2 and lower are rejected defined by REJECT PERIOD |
| 0 | 1 | 1 | All devices with priority 3 and lower are rejected defined by REJECT PERIOD |
| 1 | 0 | 0 | All devices with priority 4 and lower are rejected defined by REJECT PERIOD |
| 1 | 0 | 1 | All devices with priority 5 and lower are rejected defined by REJECT PERIOD |
| 1 | 1 | 0 | All devices with priority 6 and lower are rejected defined by REJECT PERIOD |
| 1 | 1 | 1 | All devices with priority 7 and lower are rejected defined by REJECT PERIOD |

In some configurations, access assignment rest octets information elements may be added to an access message 876. These rest octets information elements may include IMMEDIATE ASSIGNMENT REJECT message rest octets (IAR Rest Octets), IMMEDIATE ASSIGNMENT EXTENDED message rest octets (IAX Rest Octets) and/or IMMEDIATE ASSIGNMENT message rest octets (IA Rest Octets). Known access assignment request type 1, 2 and 3 rest octets are detailed in specification 3GPP TS 44.018 (Release 9), section 10.5.2. Access assignment messages are used to restrict access to a communication channel by only devices that have recently made access attempts or are in the process of making an access attempt.

The immediate assignment reject message rest octets (IAR Rest Octets) information element includes spare bits or possibly Extended RA information. The IAR Rest Octets is a type 5 information element with 3 octets length. The IAR Rest Octets information element is listed in pseudo-code in Listing (6) below.

Listing (6)

```
<IAR Rest Octets> ::=
    { 0 | 1 < Extended RA 1 : bit (5) > }
    { 0 | 1 < Extended RA 2 : bit (5) > }
    { 0 | 1 < Extended RA 3 : bit (5) > }
    { 0 | 1 < Extended RA 4 : bit (5) > }
    { null | L  -- Receiver compatible with earlier release
           | H  -- Additions in Release 10
                  < REJECT ALL LOW PRIORITY DEVICES :
                    bit (2) >
    }
    <spare padding>.
```

Listing (6) includes REJECT ALL LOW PRIORITY DEVICES, which is a 2 bit field. The presence of this field implies that all low priority devices that are making or attempting to make access are rejected and these devices are to wait for a random period defined as shown in Table 7 below.

TABLE 7

| Bit | | |
|---|---|---|
| 2 | 1 | Indication |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

An alternative approach to reject devices with a specific priority or access class is shown below in Listing (7). Note that modifications are denoted in bold type face. Listing (7):

Listing (7)

```
<IAR Rest Octets> ::=
    { 0 | 1 < Extended RA 1 : bit (5) > }
    { 0 | 1 < Extended RA 2 : bit (5) > }
    { 0 | 1 < Extended RA 3 : bit (5) > }
    { 0 | 1 < Extended RA 4 : bit (5) > }
    { null | L  -- Receiver compatible with earlier release
           | H  -- Additions in Release 10
                  {  0 | 1 < REJECT ALL PRIORITY 0 DEVICES : bit (2) >
                     0 | 1 < REJECT ALL PRIORITY 1 DEVICES : bit (2) >
                     ....
                     0 | 1 < REJECT ALL PRIORITY n DEVICES : bit (2)
                     >
                  }
    }
    <spare padding>.
```

Listing (7) includes REJECT ALL PRIORITY x DEVICES, which is a 2 bit field. The presence of this field implies that all priority x devices that are making or attempting to make access are rejected and these devices are to wait for a random period defined as shown in Table 8 below. The value of x is [0 . . . n].

TABLE 8

| Bit | | |
|---|---|---|
| 2 | 1 | Indication |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Another alternative approach to reject devices with a specific priority or access class is shown below in Listing (8). Note that modifications are denoted in bold type face. Listing (8):

| Listing (8) |
|---|
| <IAR Rest Octets> ::=<br>    { 0 \| 1 < Extended RA 1 : bit (5) > }<br>    { 0 \| 1 < Extended RA 2 : bit (5) > }<br>    { 0 \| 1 < Extended RA 3 : bit (5) > }<br>    { 0 \| 1 < Extended RA 4 : bit (5) > }<br>    { null  \| L  -- Receiver compatible with earlier release<br>           \| H  -- Additions in Release 10<br>              < REJECTED PRIORITIES: bit (3)<br>              < REJECT PERIOD : bit (2) ><br>    }<br>    <spare padding>. |

Listing (8) includes REJECT PRIORITY, which is a 2 bit field. The code of the 2 bit field is as defined as shown in Table 9 below.

TABLE 9

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Listing (8) also includes REJECT PERIOD, which is a 3 bit field. The code of this 3 bit field is as defined as shown in Table 10 below.

TABLE 10

| Bit | | | Indication |
|---|---|---|---|
| 3 | 2 | 1 | |
| 0 | 0 | 0 | All devices with priority 0 are rejected for period defined by REJECT PERIOD |
| 0 | 0 | 1 | All devices with priority 1 and lower are rejected defined by REJECT PERIOD |
| 0 | 1 | 0 | All devices with priority 2 and lower are rejected defined by REJECT PERIOD |
| 0 | 1 | 1 | All devices with priority 3 and lower are rejected defined by REJECT PERIOD |
| 1 | 0 | 0 | All devices with priority 4 and lower are rejected defined by REJECT PERIOD |
| 1 | 0 | 1 | All devices with priority 5 and lower are rejected defined by REJECT PERIOD |
| 1 | 1 | 0 | All devices with priority 6 and lower are rejected defined by REJECT PERIOD |
| 1 | 1 | 1 | All devices with priority 7 and lower are rejected defined by REJECT PERIOD |

The immediate assignment extended message rest octets (IAX Rest Octets) information element is coded according to the syntax specified below in Listing (9) and as described in 3GPP TS 44.018 Table 10.5.2.18.1. The IAX Rest Octets information element is a type 5 information element with 0-4 octets length. Note that modifications are denoted in bold type face. Listing (9):

| Listing (9) |
|---|
| <IAX Rest Octets> ::=<br>    < Compressed_Inter_RAT_HO_INFO_IND : bit ><br>    { null  \| L  -- Receiver compatible with earlier release<br>           \| H  -- Additions in Release 10<br>              < REJECT ALL LOW PRIORITY DEVICES : bit (2) ><br>    }<br>    <spare padding>. |

Listing (9) includes REJECT ALL LOW PRIORITY DEVICES, which is a 2 bit field. The presence of this field implies that all low priority devices that are making or attempting to make access are rejected and these devices are to wait for a random period defined as shown in Table 11 below.

TABLE 11

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Alternative approaches, similar to Listings (7)-(8) discussed in conjunction with IAR Rest Octets, to reject devices with specific priority or access class may also be employed.

The immediate assignment message rest octets (IA Rest Octets) information element includes spare bits and possibly either a packet uplink assignment construction, a packet downlink assignment construction, a second part packet assignment construction, frequency parameters, before time or a multiple blocks packet downlink assignment construction. The frequency parameters, before time construction combines a mobile allocation (see sub-clause 10.5.2.21) and a mobile allocation index offset (MAIO).

The IA Rest Octets information element is coded according to the syntax specified below in Listing (10) and as described in 3GPP TS 44.018 Table 10.5.2.16.1. The IA Rest Octets information element is a type 5 information element with 0-11 octets length. Note that modifications are denoted in bold type face. Listing (10):

| Listing (10) |
|---|
| <IA Rest Octets> ::=<br>    {   LL   < Compressed_Inter_RAT_HO_INFO_IND ><br>     \| LH<br>        {   00   < EGPRS Packet Uplink Assignment ><br>         \| 01   < Multiple Blocks Packet Downlink<br>                 Assignment ><br>         \| 1   -- reserved for future use (however the value 7C for the first octet shall not be used)<br>        }<br>     \| HL   < Length of frequency parameters : bit string (6) ><br>          < Frequency Parameters, before time ><br>          < Compressed_Inter_RAT_HO_INFO_IND ><br>     \| HH  {   00   < Packet Uplink Assignment ><br>               \| 01   < Packet Downlink Assignment ><br>               \| 1    < Second Part Packet Assignment ><br>        } |

-continued

```
Listing (10)

{ null  | L   -- Receiver compatible with earlier release
        | H   -- Additions in Release 10
                < REJECT ALL LOW PRIORITY DEVICES :
                  bit (2) >
        }
}
<spare padding>.
```

Listing (10) includes REJECT ALL LOW PRIORITY DEVICES, which is a 2 bit field. The presence of this field implies that all low priority devices that are making or attempting to make access are rejected and these devices are to wait for a random period defined as shown in Table 12 below.

TABLE 12

| Bit | | Indication |
|---|---|---|
| 2 | 1 | |
| 0 | 0 | Reject timer selected randomly from a range 1 to 120 seconds, with resolution of 1 second |
| 0 | 1 | Reject timer selected randomly from a range 1 to 60 minutes, with resolution of 1 minute. |
| 1 | 0 | Reject timer selected randomly from a range 1 to 24 hours, with resolution of 1 hour. |
| 1 | 1 | Reject timer selected randomly from a range 1 to 15 days, with resolution of 1 hour. |

Further Description of Alternative & Exemplary Embodiments

Figure 15:
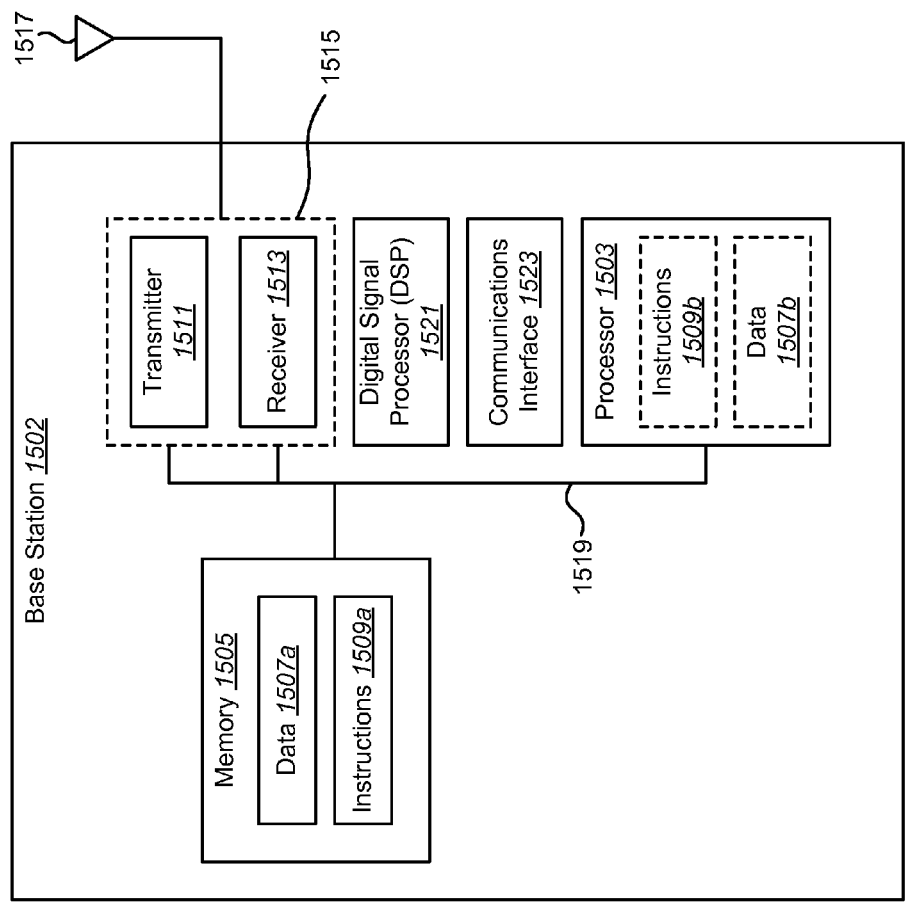
FIG. 15 illustrates certain components that may be included within a base station according to some embodiments of the present invention.

FIG. 15 illustrates certain components that may be included within a base station 1502 according to some embodiments of the present invention. A base station 1502 may also be referred to as, and may include some or all of the functionality of, an access point, a broadcast transmitter, a NodeB, an evolved NodeB, etc. The base station 1502 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the base station 1502 of FIG. 15, in an alternative configuration, a combination of processors (e.g., an ARM and DSP) could be used.

The base station 1502 also includes memory 1505. The memory 1505 may be any electronic component capable of storing electronic information. The memory 1505 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1507a and instructions 1509a may be stored in the memory 1505. The instructions 1509a may be executable by the processor 1503 to implement the methods disclosed herein. Executing the instructions 1509a may involve the use of the data 1507a that is stored in the memory 1505. When the processor 1503 executes the instructions 1509a, various portions of the instructions 1509b may be loaded onto the processor 1503, and various pieces of data 1507b may be loaded onto the processor 1503.

The base station 1502 may also include a transmitter 1511 and a receiver 1513 to allow transmission and reception of signals to and from the base station 1502. The transmitter 1511 and receiver 1513 may be collectively referred to as a transceiver 1515. An antenna 1517 may be electrically coupled to the transceiver 1515. The base station 1502 may also include (not shown) multiple transmitters, multiple receivers, multiple transceivers and/or additional antennas.

The base station 1502 may include a digital signal processor (DSP) 1521. The base station 1502 may also include a communications interface 1523. The communications interface 1523 may allow a user to interact with the base station 1502.

The various components of the base station 1502 may be coupled together by one or more buses, which may include a power bus, a control signal bus, a status signal bus, a data bus, etc. For the sake of clarity, the various buses are illustrated in FIG. 15 as a bus system 1519.

Figure 16:
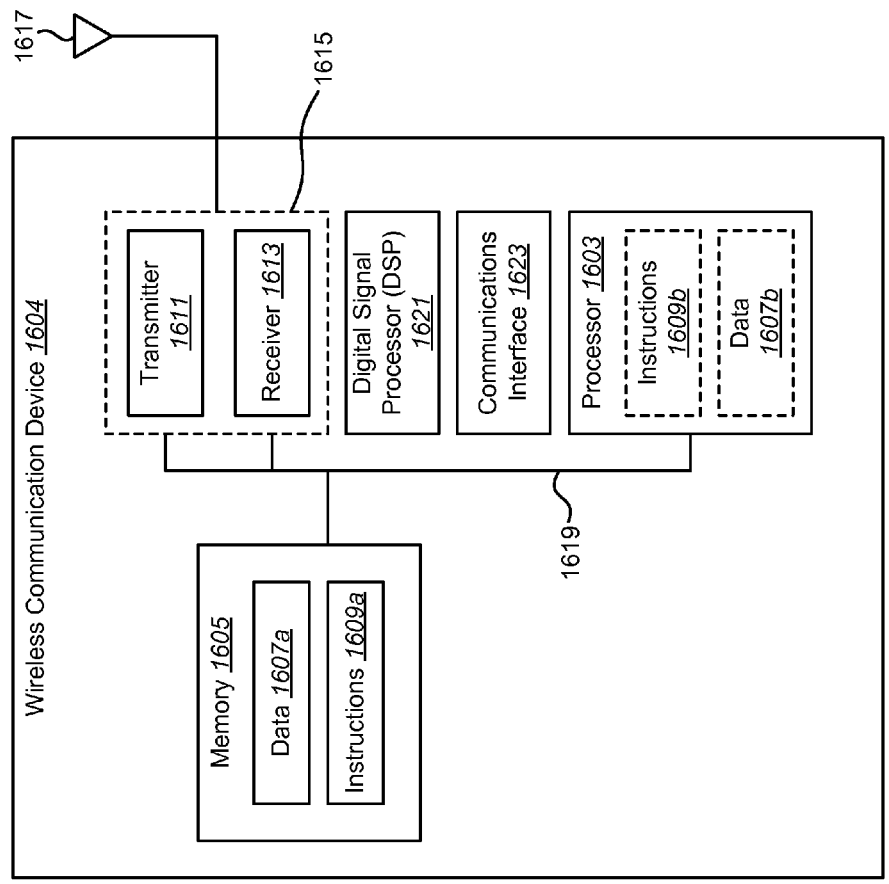
FIG. 16 illustrates certain components that may be included within a wireless communication device according to some embodiments of the present invention.

FIG. 16 illustrates certain components that may be included within a wireless communication device 1604 according to some embodiments of the present invention. The wireless communication device 1604 may be an access terminal, a mobile station, a user equipment (UE), etc. The wireless communication device 1604 includes a processor 1603. The processor 1603 may be a general purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the wireless communication device 1604 of FIG. 16, in an alternative configuration, a combination of processors (e.g., an ARM and DSP) could be used.

The wireless communication device 1604 also includes memory 1605. The memory 1605 may be any electronic component capable of storing electronic information. The memory 1605 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1607a and instructions 1609a may be stored in the memory 1605. The instructions 1609a may be executable by the processor 1603 to implement the methods disclosed herein. Executing the instructions 1609a may involve the use of the data 1607a that is stored in the memory 1605. When the processor 1603 executes the instructions 1609, various portions of the instructions 1609b may be loaded onto the processor 1603, and various pieces of data 1607b may be loaded onto the processor 1603.

The wireless communication device 1604 may also include a transmitter 1611 and a receiver 1613 to allow transmission and reception of signals to and from the wireless communication device 1604 via an antenna 1617. The transmitter 1611 and receiver 1613 may be collectively referred to as a transceiver 1615. The wireless communication device 1604 may also include (not shown) multiple transmitters, multiple antennas, multiple receivers and/or multiple transceivers.

The wireless communication device 1604 may include a digital signal processor (DSP) 1621. The wireless communication device 1604 may also include a communications interface 1623. The communications interface 1623 may allow a user to interact with the wireless communication device 1604.

The various components of the wireless communication device 1604 may be coupled together by one or more buses, which may include a power bus, a control signal bus, a status signal bus, a data bus, etc. For the sake of clarity, the various buses are illustrated in FIG. 16 as a bus system 1619.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 9, 10, 13 and 14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for restricting access to a communication channel, the method comprising:
generating a message comprising access restriction data addressed to at least one wireless communication device, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
transmitting the message from a base station to the at least one wireless communication device.

2. The method of claim 1, wherein the method is performed by the base station.

3. The method of claim 1, wherein the access restriction data is suitable for both packet processing and circuit-switched processing.

4. The method of claim 1, wherein the priority value comprises a set of priority values, and wherein generating the access restriction data generates the set of priority values.

5. The method of claim 1, wherein a portion of the message is a rest octets information element that comprises access restriction data.

6. The method of claim 5, wherein the message further indicates whether access is granted to a specified communication channel by a specified wireless communication device.

7. The method of claim 5, wherein the rest octets information element is one of:
an immediate assignment reject message;
an immediate assignment extended message;
an immediate assignment message;
a paging request type 1 message;
a paging request type 2 message; and
a paging request type 3 message.

8. The method of claim 1, wherein the time interval comprises one time interval of a set of time intervals, and wherein generating the access restriction data further indicates the one time interval.

9. The method of claim 8, wherein the one time interval is a time interval range, having a range that is one of:
a range of 1 to 120 seconds;
a range of 1 to 60 minutes;
a range of 1 to 24 hours; and
a range of 1 to 15 days.

10. The method of claim 1, wherein the communication channel comprises a plurality of dedicated channels that are available for use by wireless communication devices in a wireless communication system, and wherein wireless communication devices that have the priority value associated with them have no access to any of the plurality of dedicated channels during the time interval.

11. The method of claim 1, wherein the priority value is obtained from a receiver.

12. The method of claim 1, wherein the message is a paging message addressed to the at least one wireless communication device, and wherein transmitting the message comprises transmitting the paging message on a paging channel.

13. The method of claim 12, wherein a portion of the paging message comprises a rest octets information element.

14. The method of claim 1, wherein the message comprises an access message addressed to the at least one wireless communication device, and wherein transmitting the message comprises transmitting the access message on an access channel.

15. The method of claim 14, wherein a portion of the access message comprises a rest octets information element.

16. A method for restricting access to a communication channel by a wireless communication device, the method comprising:
receiving a message from a base station comprising access restriction data, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
restricting access to the communication channel based on the indication provided by the access restriction data.

17. The method of claim 16, wherein a portion of the message is a rest octets information element that comprises access restriction data, and wherein restricting access is further based on the rest octets information element.

18. The method of claim 17, wherein the rest octets information element is one of:
an immediate assignment reject message;
an immediate assignment extended message;
an immediate assignment message;
a paging request type 1 message;
a paging request type 2 message; and
a paging request type 3 message.

19. The method of claim 16, wherein the priority value comprises a set of priority values, and wherein generating the access restriction data generates the set of priority values.

20. The method of claim 16, wherein the wireless communication device comprises a stored priority value, and wherein restricting access occurs when the priority value comprises the stored priority value.

21. The method of claim 16, wherein the communication channel comprises an uplink communication channel.

22. The method of claim 21, further comprising transmitting uplink data via the uplink communication channel.

23. The method of claim 22, wherein the uplink data comprises a request for access to the communication channel.

24. The method of claim 16, wherein restricting access is further based on a value of time within the time interval.

25. The method of claim 24, further comprising removing access restriction to the communication channel when the value of time has elapsed.

26. The method of claim 16, wherein the time interval comprises one time interval of a set of time intervals, and wherein generating the access restriction data further indicates the one time interval.

27. The method of claim 26, wherein the one time interval is a time interval range that is one of: a range of 1 to 120 seconds; a range of 1 to 60 minutes; a range of 1 to 24 hours; and a range of 1 to 15 days.

28. The method of claim 16, wherein the communication channel comprises a plurality of dedicated channels that are available for use by wireless communication devices in a wireless communication system, and wherein wireless communication devices that have the priority value associated with them have no access to any of the plurality of dedicated channels during the time interval.

29. The method of claim 16, wherein the message further indicates whether access is granted to a specified communication channel by a specified wireless communication device.

30. The method of claim 16, wherein the message is a paging message and is received on a paging channel.

31. The method of claim 16, wherein the message is an access message and is received on an access channel.

32. An apparatus for restricting access to a communication channel, comprising:
a processor;
memory in electronic communication with the processor; and
instructions stored in the memory, the instructions being executable by the processor to:
generate a message comprising access restriction data addressed to at least one wireless communication device, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
transmit the message from a base station to the at least one wireless communication device.

33. The apparatus of claim 32, wherein a portion of the message is a rest octets information element that comprises access restriction data.

34. The apparatus of claim 33, wherein the rest octets information element is one of:
an immediate assignment reject message;
an immediate assignment extended message;
an immediate assignment message;
a paging request type 1 message;
a paging request type 2 message; and
a paging request type 3 message.

35. A wireless communication device for restricting access to a communication channel, comprising:
a processor;
memory in electronic communication with the processor; and
instructions stored in the memory, the instructions being executable by the processor to:
receive a message from a base station comprising access restriction data, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
restrict access to the communication channel based on the indication provided by the access restriction data.

36. The wireless communication device of claim 35, wherein a portion of the message is a rest octets information element that comprises access restriction data, and wherein restricting access is further based on the rest octets information element.

37. The wireless communication device of claim 36, wherein the rest octets information element is one of:
an immediate assignment reject message;
an immediate assignment extended message;
an immediate assignment message;
a paging request type 1 message;
a paging request type 2 message; and
a paging request type 3 message.

38. The wireless communication device of claim 35, wherein the wireless communication device comprises a stored priority value, and wherein restricting access occurs when the priority value comprises the stored priority value.

39. A computer-program product for restricting access to a communication channel, the computer-program product comprising a non-transitory computer-readable medium having instructions thereon, the instructions comprising:
code for causing a base station to generate a message comprising access restriction data addressed to at least one wireless communication device, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
code for causing the base station to transmit the message to the at least one wireless communication device.

40. The computer-program product of claim 39, wherein a portion of the message is a rest octets information element that comprises access restriction data.

41. The computer-program product of claim 40, wherein the rest octets information element is one of:
an immediate assignment reject message;
an immediate assignment extended message;
an immediate assignment message;
a paging request type 1 message;
a paging request type 2 message; and
a paging request type 3 message.

42. A computer-program product for restricting access to a communication channel on a wireless communication device, the computer-program product comprising a non-transitory computer-readable medium having instructions thereon, the instructions comprising:
code for causing a wireless communication device to receive a message from a base station comprising access restriction data, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and
code for causing a wireless communication device restrict access to the communication channel based on the indication provided by the access restriction data.

43. The computer-program product of claim 42, wherein a portion of the message is a rest octets information element that comprises access restriction data, and wherein restricting access is further based on the rest octets information element.

44. The computer-program product of claim 43, wherein the rest octets information element is one of:
an immediate assignment reject message;
an immediate assignment extended message;
an immediate assignment message;
a paging request type 1 message;
a paging request type 2 message; and
a paging request type 3 message.

45. The computer-program product of claim 42, wherein the wireless communication device comprises a stored priority value, and wherein restricting access occurs when the priority value comprises the stored priority value.

46. An apparatus for restricting access to a communication channel, the apparatus comprising:

means for generating a message comprising access restriction data addressed to at least one wireless communication device, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and means for transmitting the message from a base station to the at least one wireless communication device.

47. The apparatus of claim 46, wherein a portion of the message is a rest octets information element that comprises access restriction data.

48. The apparatus of claim 47, wherein the rest octets information element is one of:
- an immediate assignment reject message;
- an immediate assignment extended message;
- an immediate assignment message;
- a paging request type 1 message;
- a paging request type 2 message; and
- a paging request type 3 message.

49. A wireless communication device for restricting access to a communication channel by a wireless communication device, the wireless communication device comprising:

means for receiving a message from a base station comprising access restriction data, wherein the access restriction data indicates that a group of wireless communication devices has restricted access to a communication channel based on a priority value associated with the group, wherein the access restriction data indicates a length of a time interval during which wireless communication devices associated with the priority value do not request access to the communication channel; and means for restricting access to the communication channel based on the indication provided by the access restriction data.

50. The wireless communication device of claim 49, wherein a portion of the message is a rest octets information element that comprises access restriction data, and wherein restricting access is further based on the rest octets information element.

51. The wireless communication device of claim 50, wherein the rest octets information element is one of:
- an immediate assignment reject message;
- an immediate assignment extended message;
- an immediate assignment message;
- a paging request type 1 message;
- a paging request type 2 message; and
- a paging request type 3 message.

52. The wireless communication device of claim 49, wherein the wireless communication device comprises a stored priority value, and wherein restricting access occurs when the priority value comprises the stored priority value.

* * * * *